US006812289B2

(12) United States Patent
Van Dun et al.

(10) Patent No.: US 6,812,289 B2
(45) Date of Patent: Nov. 2, 2004

(54) CAST STRETCH FILM OF INTERPOLYMER COMPOSITIONS

(75) Inventors: Jozef J. I. Van Dun, Bellaire, TX (US); Jacquelyn A. deGroot, Lake Jackson, TX (US); Pradeep Jain, Lake Jackson, TX (US); Kalyan Sehanobish, Lake Jackson, TX (US); Pak-Wing S. Chum, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/200,814

(22) Filed: Jul. 22, 2002

(65) Prior Publication Data

US 2003/0114595 A1 Jun. 19, 2003

Related U.S. Application Data

(63) Continuation-in-part of application No. 08/966,465, filed on Nov. 6, 1997, now abandoned.
(60) Provisional application No. 60/032,825, filed on Dec. 12, 1996.

(51) Int. Cl.$^7$ .............................................. C08L 23/00
(52) U.S. Cl. ...................... 525/240; 526/348; 526/348.1; 526/348.2; 526/348.6; 526/943
(58) Field of Search ........................ 525/240; 526/348, 526/348.1, 348.2, 348.6, 943

(56) References Cited

U.S. PATENT DOCUMENTS

| | | |
|---|---|---|
| 3,645,992 A | 2/1972 | Elston |
| 3,914,342 A | 10/1975 | Mitchell |
| 4,314,912 A | 2/1982 | Lowery, Jr. et al. |
| 4,544,762 A | 10/1985 | Kaminsky et al. |
| 4,547,475 A | 10/1985 | Glass et al. |
| 4,612,300 A | 9/1986 | Coleman, III |
| 4,798,081 A | 1/1989 | Hazlitt et al. |
| 4,960,878 A | 10/1990 | Crapo et al. |
| 5,008,204 A | 4/1991 | Stehling |
| 5,015,749 A | 5/1991 | Schmidt et al. |
| 5,041,583 A | 8/1991 | Sangokoya |
| 5,041,584 A | 8/1991 | Crapo et al. |
| 5,041,585 A | 8/1991 | Deavenport et al. |
| 5,055,438 A | 10/1991 | Canich |
| 5,057,475 A | 10/1991 | Canich et al. |
| 5,064,802 A | 11/1991 | Stevens et al. |
| 5,089,321 A | 2/1992 | Chum et al. |
| 5,096,867 A | 3/1992 | Canich |
| 5,132,380 A | 7/1992 | Stevens et al. |
| 5,153,157 A | 10/1992 | Hlatky et al. |
| 5,246,783 A | 9/1993 | Spenadel et al. |
| 5,272,236 A | 12/1993 | Lai et al. |
| 5,296,433 A | 3/1994 | Siedle et al. |
| 5,322,728 A | 6/1994 | Davey et al. |
| 5,350,723 A | 9/1994 | Neithamer et al. |
| 5,374,696 A | 12/1994 | Rosen et al. |
| 5,395,471 A | 3/1995 | Obijeski et al. |
| 5,453,410 A | 9/1995 | Kolthammer et al. |
| 5,470,993 A | 11/1995 | Devore et al. |
| 5,491,246 A | 2/1996 | Rosen et al. |
| 5,674,342 A | 10/1997 | Obijeski et al. |
| 5,677,383 A | 10/1997 | Chum et al. |
| 5,747,594 A | 5/1998 | DeGroot et al. |
| 5,792,534 A | 8/1998 | DeGroot et al. |
| 5,847,053 A | 12/1998 | Chum et al. |
| 5,874,139 A | 2/1999 | Bosier et al. |
| 5,935,505 A | 8/1999 | Whetten et al. |
| 5,942,579 A | 8/1999 | Falla et al. |
| 5,972,444 A | 10/1999 | Patel et al. |
| 6,469,103 B1 * | 10/2002 | Jain et al. .................. 525/240 |

FOREIGN PATENT DOCUMENTS

| | | |
|---|---|---|
| EP | 277003 | 8/1988 |
| EP | 416815 | 3/1991 |
| EP | 468651 | 1/1992 |
| EP | 514828 | 11/1992 |
| EP | 520732 | 12/1992 |
| EP | 776909 | 4/1997 |
| EP | 783022 | 9/1997 |
| WO | 94/17112 | 8/1992 |
| WO | 94/00500 | 6/1994 |
| WO | 94/25523 | 10/1994 |
| WO | 96/07680 | 3/1996 |
| WO | 96/18679 | 6/1996 |

OTHER PUBLICATIONS

B. C. Trudell and G. D. Malpass, *Exceed™ mLLDPE Hexene Copolymers Structure/Property Relationships*, Exxon Chemical.
Research Disclosure 31163.
J. M. Dealy, *Theometers for Molten Plastics*, Van Nostrand Co., pp. 97–99 (1982).

(List continued on next page.)

Primary Examiner—Bernard Lipman

(57) ABSTRACT

This invention relates to cast films prepared from interpolymer compositions comprising;

(A) a substantially linear ethylene/α-olefin interpolymer present in the composition in an amount of from about 10 to about 100% by weight based on the combined weight of Components A and B; and (B) a heterogeneous interpolymer present in the composition in an amount of from about 0 to about 90% by weight based on the combined weight of Components A and B; and wherein said interpolymer composition has an $I_{10}/I_2$ value of < about 10.0 and is characterized as having a viscosity at 100 rad/s and a relaxation time (τ) which satisfies either of the following relationships;

Log(viscosity at 100 rad/s)≦4.43−0.8 log($I_2$)

or log(τ)>−1.2−1.3* log($I_2$)

The interpolymer compositions are useful in cast stretch film manufacture with the resulting cast films having an excellent balance of strength and processability.

37 Claims, No Drawings

OTHER PUBLICATIONS

G. B. Butler et al., *Macromolecular Science–Reviews in Macromolecular Chemistry and Physics*, C29, (1989) pp. 285–297.

M. Shida et al., *Polymer Engineering and Science*, "Correlation of Low Density Polyethylene Rheological Measurements with Optical and Processing Properties", vol. 17, No. 11, p. 770 (1977).

A. V. Ramamurthy, *Journal of Rheology*, "Wall Slip in Viscous Fluids and Influence of Materials of Contruction", pp. 337–357, 1986.

L. Wild et al., *Journal of Polymer Science, Polymer Physic Edition*, "Determination of Branching Distributions in Polyethylene and Ethylene Copolymers", vol. 20 (1982), pp. 441–455.

Williams and Ward, Journal of Polymer Science, Polymer Letters, vol. 6, pp. 621–624, (1968).

J. B. Lambert and S. Zhang, *Journal of Chemical Society, Chemical Communications*, "Tetrakis (pentafluorophenyl) borate: a New Anion for Silylium Cations in the Condensed Phase", pp. 2430–2443, 1993.

J. B. Lambert et al., *Orgamometallics*, Silyl Cations in the Solid and in Solution, (1994) pp. 383–384.

X. Yang et al., *Journal of American Chemical Society*, "Cation–like" Homogeneous Olefin Polymerization Catalysts Based upon Zironocene Alkyls and Tris(pentafluoropheny)borane, 1991, pp. 3623–3625.

Japanese abstract of JP 7–309982 (Mitsui Petrochem Ind. Ltd), Nov. 28, 1995.

* cited by examiner

CAST STRETCH FILM OF INTERPOLYMER COMPOSITIONS

CROSS-REFERENCE TO RELATED APPLICATIONS

This application is a continuation-in-part of U.S. application Ser. No. 08/966,465 filed Nov. 6, 1997 now abandoned which claims the benefit of U.S. Provisional Application No. 60/032,825 filed Dec. 12, 1996.

STATEMENT REGARDING FEDERALLY SPONSORED RESEARCH OR DEVELOPMENT

Not Applicable

BACKGROUND OF THE INVENTION

Cast stretch films are high clarity films utilized to protect and unitize manufactured goods or items for transport and storage. Such films with commercial applicability have been produced from ethylene polymers and copolymers. It is highly desirable for such polymers to have excellent processability, i.e., they can be processed into cast stretch film at a faster throughput rate with lower energy requirements and with reduced melt flow perturbations. This has previously required the use of ethylene/α-olefin copolymers with a high shear rate response (where shear response is defined as the high load melt index divided by the melt index of the polymer). It is known to those skilled in the art, that, for such polymers, high melt flow ratio (MFR) values are indicative of a relatively broad molecular weight distribution. Typical Ziegler catalyzed linear low density polyethylene has been used in this application because of its relatively broad molecular weight distribution.

While it is important that polymers used for cast stretch film applications process easily, it is also highly desirable for such films to exhibit high impact strength and on-pallet puncture. For traditional Ziegler Natta catalyzed linear ethylene/α-olefin polymers, increasing impact and puncture strength is often accomplished by narrowing the molecular weight distribution and/or increasing the molecular weight.

U.S. Pat. Nos. 5,231,151 and 5,487,938 (Spencer et al.) teach that linear low density polyethylene (LLDPE) which has a high density fraction, as measured by ATREF, of higher than 17% and a molecular weight distribution (MWD) of less than about 3.6, are particularly effective in making cast films used in pallet wrapping applications.

U.S. Pat. No. 4,243,619 (Fraser et al.) describes a process for making film from a narrow molecular weight distribution polymer compositions which are ethylene/α-olefin copolymers prepared by a Ziegler catalyst useful for stretch film applications and exhibiting good optical and mechanical properties.

U.S. Pat. No. 5,175,049 (Huff et al.) describes the composition of a wrap-packaging cling film which is a film laminate comprising at least two layers. The outer layer comprises a very low density ethylene/α-olefin copolymer (LVLDPE) and at least one of the layers comprises a linear low density ethylene/α-olefin copolymer (LLDPE). These compositions exhibited differential cling properties suitable for wrap packaging.

It is also well known that narrow molecular weight distribution linear polymers possess low melt elasticity causing problems in melt fabrication. Such polymers also experience significant surface melt fracture at relatively low extrusion rates thereby processing unacceptably and causing surface irregularities in the finished product. These irregularities can present difficulties in, for instance, electronic reading of bar codes on packaged material. Thus there remains a difficulty in producing resins which are able to exhibit good processability, while exhibiting improved, on-pallet puncture, dart impact and stretchability and yielding film with few surface irregularities.

The relatively recent introduction of metallocene-based catalysts for ethylene/α-olefin copolymerization has resulted in the production of new ethylene interpolymers. The term "interpolymer" is used herein to indicate a polymer wherein at least two different monomers are polymerized to make the interpolymer. This includes copolymers, terpolymers, etc.

These metallocene catalysts include the bis (cyclopentadienyl)-catalyst systems and the mono (cyclopentadienyl) Constrained Geometry catalyst systems. Such constrained geometry metal complexes and methods for their preparation are disclosed in U.S. application Ser. No. 545,403, filed Jul. 3, 1990 (EP-A-416,815); U.S. application Ser. No. 547,718, filed Jul. 3, 1990 (EP-A-468,651); U.S. application Ser. No. 702,475, filed May 20, 1991 (EP-A-514,828); U.S. application Ser. No. 876,268, filed May 1, 1992, (EP-A-520,732); U.S. application Ser. No. 8,003, filed Jan. 21, 1993 (WO93/19104); U.S. application Ser. No. 08/241,523, (WO95/00526); as well as U.S. Pat. Nos. 5,055,438, 5,057,475, 5,096,867, 5,064,802, and 5,132,380.

In EP-A 418,044, published Mar. 20, 1991 (equivalent to U.S. Ser. No. 07/758,654) and in U.S. Ser. No. 07/758,660 certain cationic derivatives of the foregoing constrained geometry catalysts that are highly useful as olefin polymerization catalysts are disclosed and claimed. In U.S. Ser. No. 720,041, filed Jun. 24, 1991, certain reaction products of the foregoing constrained geometry catalysts with various boranes are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States Patent applications, issued United States Patents and published European Patent Applications are herein incorporated in their entirety by reference thereto.

The use of metallocene catalyst systems have generated new interpolymers and new requirements for compositions containing these materials. Such polymers are known as homogeneous interpolymers and are characterized by their narrower molecular weight and composition distributions (defined as the weight percent of the polymer molecules having a comonomer content within 50 percent of the median total molar comonomer content) relative to, for example, traditional Ziegler catalyzed heterogeneous polyolefin polymers. Generally blown and cast film made with such polymers are tougher and have better optical properties and heat sealability than film made with Ziegler Natta catalyzed LLDPE. It is known that metallocene LLDPE (see "EXCEED™ mLLDPE Hexene Copolymers—Structure/ Property Relationships" by B. C. Trudell and G. D. Malpass Jr,) offer significant advantages over Ziegler Natta produced LLDPE's in cast film for pallet wrap applications, particularly improved on-pallet puncture resistance. Such metallocene LLDPE's however have a significantly poorer processability on the extruder than Ziegler Natta products. The metallocene LLDPE's known as EXCEED™ (Trademark of Exxon Chemical) have Composition Distribution Branch Index (CBDI) values higher than 65% (see "EXCEED™ mLLDPE Hexene Copolymers—Structure/Property Relationships" by B. C. Trudell and G. D. Malpass Jr.). Ziegler Natta produced materials have broader composition distributions and have values lower than 65%.

The substantially linear ethylene/α-olefin polymers described in U.S. Pat. No. 5,272,236 (Lai et al.) are also metallocene based homogeneous polymers, as the comonomer is randomly distributed within a given interpolymer molecule and wherein substantially all of the interpolymer molecules have the same ethylene/comonomer ratio within that interpolymer. Such polymers are unique however due to their excellent processability and unique rheological properties and high melt elasticity and resistance to melt fracture. These polymers can be successfully prepared in a continuous polymerization process using the constrained geometry metallocene catalyst systems.

Recent work has examined the properties of blends of metallocene-catalyzed LLDPE and High pressure LDPE or Ziegler catalyzed LLDPE. Such blends typically seek to balance the processability of Ziegler LLDPE with the improved physical properties of metallocene based polymers. Additionally, such blends may lower the cost of production compared to pure metallocene-based polymers due to the higher costs associated with the new and complex metallocene catalyst systems relative to the well-established Ziegler catalyst systems.

Research Disclosure No. 310163 (Anonymous) teaches that blends of Ziegler Natta- and metallocene-catalyzed ethylene copolymers when fabricated into cast films have improved optical, toughness, heat sealability, film blocking and unwind noise properties when compared with metallocene-catalyzed polymer alone. For example a blend comprising 90% of an ethylene hexene metallocene LLDPE (3.0 $I_2$, 0.917 g/cm$^3$) with 10% of ethylene hexene Ziegler Natta catalyzed LLDPE (0.5 $I_2$, 0.921 g/cm$^3$) has increased TD tear resistance and MD ultimate tensile and secant modulus with no other changes in film properties over the 100% blend of the above mentioned metallocene LLDPE.

Research Disclosure No. 37652 (Anonymous) teaches that blends of high pressure polyethylene resins and resins made by single site metallocene catalysts display superior optical and heat sealability properties useful in cast film applications.

Research Disclosure No. 37644 (Anonymous) teaches that blends of traditionally (Ziegler-Natta) catalyzed resins and resins made by single site metallocene catalysts display superior transverse direction tear and machine direction ultimate tensile properties useful in cast film applications.

U.S. Pat. No. 5,376,439 (Hodgson et al.) describes a polymer composition comprising a blend of from about 25 to about 90% by weight of a very low density ethylene polymer having a compositional breadth index greater than about 70% and from about 10 to about 75% by weight of a low to medium density ethylene polymer having a compositional breadth index less than about 70%. The films prepared from these compositions exhibited excellent elongation, tensile and impact properties.

WO 94/25523(Chum et al.) teaches that films having synergistically enhanced physical properties can be made, when the film is a blend of at least one homogeneously branched ethylene/α-olefin interpolymer and a heterogeneously branched ethylene/α-olefin interpolymer. Films made from such formulated compositions have surprisingly good impact and tensile properties, and an especially good combination of modulus and toughness.

U.S. Pat. No. 5,395,471 (Obijeski et al.) teaches the improvement in line speed on extrusion coating equipment for compositions of at least one substantially linear polyethylene alone or in combination with at least one high-pressure ethylene polymer and/or with at least one heterogeneous linear olefin polymer. The new compositions have higher draw down rates, lower neck-in and higher resistance to draw resonance and at the same time maintain or improve on the abuse resistance of the film.

Thus it would be desirable to develop polymers which would allow production of cast stretch films which exhibit good processing characteristics. It would also be desirable to produce cast stretch films with good processing characteristics and good impact strength, puncture and stretchability properties. It would also be desirable to produce cast stretch films which are less sensitive to effects of orientation. Finally, it would also be desirable from a cost point of view to produce such improved cast stretch films from polymers which are blends of metallocene and Ziegler-based catalyst products.

SUMMARY OF THE INVENTION

The present invention pertains to interpolymer compositions and cast stretch films made therefrom wherein the interpolymer composition comprises;

(A) a substantially linear ethylene/α-olefin interpolymer present in the composition in an amount of from about 10 to about 100% by weight based on the combined weight of Components A and B; and (B) a heterogeneous interpolymer present in the composition in an amount of from about 0 to about 90% by weight based on the combined weight of Components A and B; and wherein said interpolymer composition has an $I_{10}/I_2$ value of<about 10.0 and is characterized as having a viscosity at 100 rad/s and a relaxation time (τ) which satisfies either of the following relationships;

$$\text{Log(viscosity at 100 rad/s)} \leq 4.43 - 0.8 \log(I_2)$$

or $$\log(\tau) > -1.2 - 1.3 * \log(I_2)$$

The present invention also pertains to interpolymer compositions and cast stretch films made therefrom wherein the interpolymer composition has two distinct peaks in the ATREF curve; and wherein $$T_2 - T_1 \leq 25° C.$$

where $T_2$ is the elution temperature of the highest crystallization peak and $T_1$ is the elution temperature of the lowest crystallization peak;
and wherein $$Mv_1/Mv_2 \leq 1;$$

where $Mv_2$ is the viscosity average molecular weight at the peak having the highest elution temperature and $Mv_1$ is the viscosity average molecular weight at the peak having the lowest elution temperature;
and wherein $$M_w/M_n \leq 3.$$

The interpolymers and films of the current invention have a favorable balance of processability and on-pallet properties, and can have a synergistically higher dart impact strength than the Ziegler Natta products and metallocene-based LLDPE's which do not comprise a substantially linear ethylene/α-olefin interpolymer. The interpolymers of the present invention are similar to polymers prepared from Ziegler Natta catalysts in terms of processability but the on-pallet performance of the cast stretch films of the present invention, including stretchability and puncture resistance is much better. The cast stretch films of the present invention are equivalent to films derived from metallocene LLDPE's which contain no long chain branching, in terms of their on pallet performance but their processability is much better.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Stretch film is the name given to polyethylene film which can be cold-stretched in the longitudinal and/or transverse direction without the application of heat and which when stretched around a load, can maintain tension for an extended period of time. Cast stretch film can be differentiated from blown stretch film by the method of fabrication. The major differences between cast and blown films are related to cooling methods, film orientation, line speed and gauge control. Cast films typically exhibit better optical properties and a much higher degree of machine direction orientation as compared to blown film. Cast stretch films and film structures having the novel properties described herein can be made using conventional cast film fabrication techniques. Conventional casting processes are described for example in *Modern Plastics Encyclopedia*/89 mid October 1988, Vol. 65, no. 11, pp. 232–234, the disclosure of which is herein incorporated by reference.

The term "linear ethylene/α-olefin polymers" means that the olefin polymer does not have long chain branching. That is, the linear ethylene/α-olefin polymer has an absence of long chain branching, as for example the linear low density polyethylene polymers or linear high density polyethylene polymers made using uniform branching (i.e., homogeneously branched) distribution polymerization processes (e.g., U.S. Pat. No. 3,645,992 (Elston), the disclosure of which is incorporated herein by reference) and are those in which the comonomer is randomly distributed within a given interpolymer molecule and wherein substantially all of the interpolymer molecules have the same ethylene/comonomer ratio within that interpolymer. The term "linear ethylene/α-olefin polymers" does not refer to high pressure branched polyethylene which is known to those skilled in the art to have numerous long chain branches. Typically, the linear ethylene/α-olefin polymer is an ethylene/α-olefin interpolymer, wherein the α-olefin is at least one $C_3$–$C_{20}$ α-olefin (e.g., 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_3$–$C_{20}$ α-olefin, especially an ethylene/1-octene copolymer. The substantially linear ethylene/α-olefin interpolymers of the present invention are not in the same class as traditional linear ethylene/α-olefin polymers (e.g., heterogeneously branched linear low density polyethylene, linear high density polyethylene, or homogeneously branched linear polyethylene), nor are they in the same class as traditional highly branched low density polyethylene. The substantially linear ethylene/α-olefin interpolymers useful in this invention surprisingly have excellent processability, even though they have relatively narrow molecular weight distributions. Even more surprising, the melt flow ratio ($I_{10}/I_2$) of the substantially linear ethylene/α-olefin interpolymers can be varied essentially independently of the polydispersity index (i.e., molecular weight distribution ($M_w/M_n$)). This is contrasted with conventional heterogeneously branched linear polyethylene resins having rheological properties such that as the polydispersity index increases, the $I_{10}/I_2$ value also increases.

Substantially Linear Ethylene/α-Olefin Interpolymers (Component A)

The substantially linear ethylene/α-olefin polymers and interpolymers of the present invention are herein defined as in U.S. Pat. No. 5,272,236 (Lai et al.), the entire contents of which is incorporated by reference. The substantially linear ethylene/α-olefin polymers and are those in which the comonomer is randomly distributed within a given interpolymer molecule and wherein substantially all of the interpolymer molecules have the same ethylene/comonomer ratio within that interpolymer.

The term "substantially linear" ethylene/α-olefin interpolymer means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least one carbon more than two carbons less than the total number of carbons in the comonomer, for example, the long chain branch of an ethylene/octene substantially linear ethylene interpolymer is at least seven (7) carbons in length (i.e., 8 carbons less 2 equals 6 carbons plus one equals seven carbons long chain branch length). The long chain branch can be as long as about the same length as the length of the polymer back-bone. Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference. Long chain branching, of course, is to be distinguished from short chain branches which result solely from incorporation of the comonomer, so for example the short chain branch of an ethylene/octene substantially linear polymer is six carbons in length, while the long chain branch for that same polymer is at least seven carbons in length.

The "rheological processing index" (PI) is the apparent viscosity (ink poise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene/α-olefin polymers described herein, the PI is the apparent viscosity (in kpoise) of a material measured by GER at an apparent shear stress of $2.15 \times 10^6$ dyne/cm$^2$. The novel substantially linear ethylene/α-olefin interpolymers described herein preferably have a PI in the range of about 0.01 kpoise to about 50 kpoise, preferably about 15 kpoise or less. The novel substantially linear ethylene/α-olefin polymers described herein have a PI less than or equal to about 70 percent of the PI of a comparative linear ethylene/α-olefin polymer at about the same $I_2$ and $M_w/M_n$.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene/α-olefin interpolymers is at least 50 percent greater than the critical shear rate at the onset of surface melt fracture of a linear ethylene/α-olefin polymer having about the same $I_2$ and $M_w/M_n$, wherein "about the same" as used herein means that each value is within 10 percent of the comparative value of the comparative linear ethylene polymer.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 4,798,081 (Hazlitt et al.), or as is described in U.S. Pat. No. 5,008,204 (Stehling), the disclosure of which is incorporated herein by reference. The technique for calculating CDBI is described in U.S. Pat. No. 5,322,728 (Davey et al.) and in U.S. Pat. No. 5,246,783 (Spenadel et al.). or in U.S. Pat. No. 5,089,321 (Chum et al.) the disclosures of all of which are incorporated herein by reference. The SCBDI or CDBI for the substantially linear olefin interpolymers used in the present invention is preferably greater than about 30 percent, especially greater than about 50 percent. The substantially linear ethylene/α-olefin interpolymers used in this invention essentially lack a measurable "high density" fraction as measured by the TREF technique (i.e., the homogeneous ethylene/α-olefin interpolymers do not contain a polymer fraction with a degree of branching less than or equal to 2 methyls/1000 carbons). The substantially linear ethylene/α-olefin polymers also do not contain any highly short chain branched fraction (i.e., they do not contain a polymer fraction with a degree of branching equal to or more than 30 methyls/1000 carbons).

The Constrained Geometry Catalysts

The catalysts used to prepare the substantially linear ethylene/α-olefin interpolymer component of the present invention (Component A) are based on those described in the art as constrained geometry metal complexes. These catalysts are highly efficient, meaning that they are efficient enough such that the catalyst residues left in the polymer do not influence the polymer quality. Typically, less than or equal to about 10 ppm of the metal atom (designated herein as "M") is detectable and, when using the appropriate cocatalyst (e.g., one of the aluminoxanes described herein) the detectable aluminum residue is less than or equal to about 250 ppm.

Said catalysts are believed to exist in the form of a mixture of one or more cationic or zwitterionic species derived from the foregoing metal complexes a). Fully cationic or partially charge separated metal complexes, that is, zwitterionic metal complexes, have been previously disclosed in U.S. Pat. Nos. 5,470,993 and 5,486,632, the teachings of which are herein incorporated in their entirety by reference thereto.

The cationic complexes are believed to correspond to the formula:

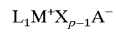

$$L_1 M^+ X_{p-1} A^-$$

wherein:

M is a Group 4 metal in the +4 or +3 formal oxidation state;

L independently each occurrence is a cyclopentadienyl-, indenyl-, tetrahydroindenyl-, fluorenyl-, tetrahydrofluorenyl-, or octahydrofluorenyl-group optionally substituted with from 1 to 8 substituents independently selected from the group consisting of hydrocarbyl, halo, halohydrocarbyl, aminohydrocarbyl, hydrocarbyloxy, dihydrocarbylamino, dihydrocarbylphosphino, silyl, aminosilyl, hydrocarbyloxysilyl, and halosilyl groups containing up to 20 non-hydrogen atoms, or further optionally two such L groups may be joined together by a divalent substituent selected from hydrocarbadiyl, halohydrocarbadiyl, hydrocarbyleneoxy, hydrocarbyleneamino, siladiyl, halosiladiyl, and divalent aminosilane, groups containing up to 20 non-hydrogen atoms;

X independently each occurrence is a monovalent anionic σ-bonded ligand group, a divalent anionic σ-bonded ligand group having both valences bonded to M, or a divalent anionic σ-bonded ligand group having one valency bonded to M and one valency bonded to an L group, said X containing up to 60 nonhydrogen atoms;

l is one;

p is 0, 1 or 2, and is 1 less than the formal oxidation state of M when X is an monovalent anionic σ-bonded ligand group or a divalent anionic σ-bonded ligand group having one valency bonded to M and one valency bonded to an L group, or p is 1+1 less than the formal oxidation state of M when X is a divalent anionic σ-bonded ligand group having both valencies bonded to M; and $A^-$ is a noncoordinating, compatible anion derived from the activating cocatalyst.

The zwitterionic complexes in particular result from activation of a Group 4 metal diene complex that is in the form of a metallocyclopentene, wherein the metal is in the +4 formal oxidation state, (that is X is 2-butene-1,4-diyl, or a hydrocarbyl substituted derivative thereof, having both valencies bonded to M) by the use of a Lewis acid activating cocatalyst, especially tris(perfluoro-aryl)boranes. These zwitterionic complexes are believed to correspond to the formula:

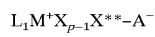

wherein:

M is a Group 4 metal in the +4 formal oxidation state;

L, X, l and p are as previously defined;

$X^{**}$ is the divalent remnant of the conjugated diene, X', formed by ring opening at one of the carbon to metal bonds of a metallocyclopentene; and $A^-$ is a noncoordinating, compatible anion derived from the activating cocatalyst.

As used herein, the recitation "noncoordinating" means an anion which either does not coordinate to the cationic metal complex or which is only weakly coordinated therewith remaining sufficiently labile to be displaced by a neutral Lewis base, including an α-olefin. A non-coordinating anion specifically refers to an anion which when functioning as a charge balancing anion in the catalyst system of this invention, does not transfer a fragment thereof to said cation thereby forming a neutral four coordinate metal complex and a neutral byproduct. "Compatible anions" are anions which are not degraded to neutrality when the initially formed complex decomposes and are noninterfering with desired subsequent polymerizations.

X' independently each occurrence is a neutral Lewis base ligating compound, having up to 20 atoms;

Examples of coordination complexes used for the present invention include the foregoing species corresponding to the formula:

 (I)

Preferred X' groups are phosphines, especially trimethylphosphine, triethylphosphine, triphenylphosphine and bis(1,2-dimethylphosphino)ethane; $P(OR)_3$, wherein R is a $C_1-C_{30}$ hydrocarbyl; ethers, especially tetrahydrofuran; amines, especially pyridine, bipyridine, tetramethylethylenediamine (TMEDA), and triethylamine; olefins; and conjugated dienes having from 4 to 40 carbon atoms. Complexes including conjugated diene X' groups include those wherein the metal is in the +2 formal oxidation state and wherein L, M, X, X', and p, are as previously defined and q is 0, 1 or 2.

A preferred metal complex belongs to the foregoing class (I) and corresponds to the formula:

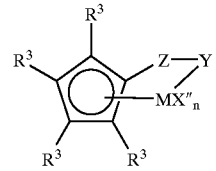

wherein:

M is titanium, zirconium or hafnium in the +2, +3 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (i.e., a hydrocarbadiyl, siladiyl or germadiyl group) thereby forming a fused ring system, each X" is a halo, hydrocarbyl, hydrocarbyloxy, hydrocarbylamino, or silyl group, said group having up to 20 non-hydrogen atoms, or two X" groups together form a neutral $C_{5-30}$ conjugated diene or a divalent derivative thereof;

Y is —O—, —S—, —NR*—, —PR*—;

Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein R* is as previously defined, and n is an integer from 1 to 3.

Most preferred coordination complexes used for the present invention are complexes corresponding to the formula:

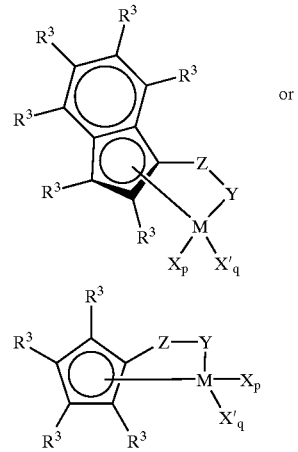

wherein:

$R^3$ independently each occurrence is a group selected from hydrogen, hydrocarbyl, halohydrocarbyl, silyl, germyl and mixtures thereof, said group containing up to 20 nonhydrogen atoms;

M is titanium, zirconium or hafnium;

Z, Y, X and X' are as previously defined;

p is 0, 1 or 2; and q is zero or one;

with the proviso that:

when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)phosphino-substituted derivatives thereof, said X group having up to 20 nonhydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M.

More preferred coordination complexes used for the present invention are complexes corresponding to the formula:

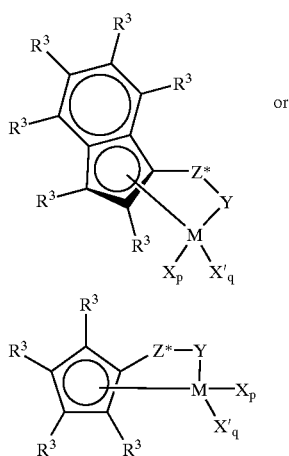

wherein:

$R^3$ independently each occurrence is hydrogen or $C_{1-6}$ alkyl;

M is titanium;

Y is —O—, —S—, —NR*—, —PR*—;

Z* is $SiR^*_2$, $CR^*_2$, $SiR^*_2SiR^*_2$, $CR^*_2CR^*_2$, CR*=CR*, $CR^*_2SiR^*_2$, or $GeR^*_2$;

R* each occurrence is independently hydrogen, or a member selected from hydrocarbyl, hydrocarbyloxy, silyl, halogenated alkyl, halogenated aryl, and combinations thereof, said R* having up to 20 non-hydrogen atoms, and optionally, two R* groups from Z (when R* is not hydrogen), or an R* group from Z and an R* group from Y form a ring system;

p is 0, 1 or 2;

q is zero or one;

with the proviso that:

when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 2-butene-1,4-diyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

The complexes can be prepared by use of well known synthetic techniques. A preferred process for preparing the metal complexes is disclosed in U.S. Ser. No. 8/427,378, filed Apr. 24, 1995, the teachings of which are hereby incorporated by reference. The reactions are conducted in a suitable noninterfering solvent at a temperature from −100 to 300° C., preferably from −78 to 100° C., most preferably from 0 to 50° C. A reducing agent may be used to cause the metal M, to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts useful in combination with the aforementioned coordination complexes are those compounds capable of abstraction of an X substituent therefrom to form an inert, noninterfering counter ion, or that form a zwitterionic derivative of the complex. Suitable activating cocatalysts for use herein include perfluorinated tri(aryl) boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, and ferrocenium salts of compatible, noncoordinating anions. Suitable activating techniques include the use of bulk electrolysis (explained in more detail hereinafter). A combination of the foregoing activating cocatalysts and techniques may be employed as well. The foregoing activating cocatalysts and activating techniques have been previously taught with respect to different metal complexes in the following references: EP-A-277,003, U.S. Pat. Nos. 5,153,157, 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992), the teachings of which are hereby incorporated by reference.

More particularly, suitable ion forming compounds useful as cocatalysts in one embodiment for the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base.

"Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*—H)^+_d(A)^{d-}$$

wherein:

L* is a neutral Lewis base;

(L*—H)+ is a Bronsted acid;

$A^{d-}$ is a noncoordinating, compatible anion having a charge of d−, and d is an integer from 1 to 3.

More preferably $A^{d-}$ corresponds to the formula:

$$[M'Q_4]^-;$$

wherein:

M' is boron or aluminum in the +3 formal oxidation state; and

Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is one, that is, the counter ion has a single negative charge and is A⁻. Activating cocatalysts comprising boron which are particularly useful in the preparation of catalysts of this invention may be represented by the following general formula:

$$(L^*—H)^+(BQ_4)^-;$$

wherein:

L* is as previously defined;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts for this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethyl-N-dodecylammonium tetrakis (pentafluorophenyl)borate,
N,N-dimethyl-N-octadecylammonium tetrakis (pentafluorophenyl)borate,
N-methyl-N,N-didodecylammonium tetrakis (pentafluorophenyl)borate,
N-methyl-N,N-dioctadecylammonium tetrakis (pentafluorophenyl)borate,
N,N-dimethylanilinium tetrakis(pentafluorophenyl)borate,
N,N-dimethylanilinium n-butyltris(pentafluorophenyl) borate,
N,N-dimethylanilinium benzyltris(pentafluorophenyl) borate,
N,N-dimethylanilinium tetrakis(4-(t-butyldimethylsilyl)-2, 3,5,6-tetrafluorophenyl)borate,
N,N-dimethylanilinium tetrakis(4-(triisopropylsilyl)-2,3,5, 6-tetrafluorophenyl)borate,
N,N-dimethylanilinium pentafluorophenoxytris (pentafluorophenyl)borate,
N,N-diethylanilinium tetrakis(pentafluorophenyl)borate,
N,N-dimethyl-2,4,6-trimethylanilinium tetrakis (pentafluorophenyl)borate,
trimethylammonium tetrakis(2,3,4,6-tetrafluorophenyl) borate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate,
N,N-dimethylanilinium tetrakis(2,3,4,6-tetrafluorophenyl) borate,
N,N-diethylanilinium tetrakis(2,3,4,6-tetrafluorophenyl) borate, and
N,N-dimethyl-2,4,6-trimethylanilinium tetrakis(2,3,4,6-tetrafluorophenyl)borate;
disubstituted ammonium salts such as:
di-(i-propyl)ammonium tetrakis(pentafluorophenyl)borate, and
dicyclohexylammonium tetrakis(pentafluorophenyl)borate;
trisubstituted phosphonium salts such as:
triphenylphosphonium tetrakis(pentafluorophenyl)borate,
tri(o-tolyl)phosphonium tetrakis(pentafluorophenyl)borate, and
tri(2,6-dimethylphenyl)phosphonium tetrakis (pentafluorophenyl)borate;
disubstituted oxonium salts such as:
diphenyloxonium tetrakis(pentafluorophenyl)borate,
di(o-tolyl)oxonium tetrakis(pentafluorophenyl)borate, and
di(2,6-dimethylphenyl)oxonium tetrakis(pentafluorophenyl) borate;
disubstituted sulfonium salts such as:
diphenylsulfonium tetrakis(pentafluorophenyl)borate,
di(o-tolyl)sulfonium tetrakis(pentafluorophenyl)borate, and
bis(2,6-dimethylphenyl)sulfonium tetrakis (pentafluorophenyl)borate.

Preferred (L*—H)⁺ cations are N,N-dimethylanilinium, tributylammonium, N-methyl-N,N-didodecylammonium, N-methyl-N,N-dioctadecylammonium, and mixtures thereof.

Another suitable ion forming, activating cocatalyst comprises a salt of a cationic oxidizing agent and a noncoordinating, compatible anion represented by the formula:

$$(Ox^{e+})_d(A^{d-})_{e-}$$

wherein:

$Ox^{e+}$ is a cationic oxidizing agent having a charge of e+;

e is an integer from 1 to 3; and $A^{d-}$ and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$\text{©}^+A^-$$

wherein:

$\text{©}^+$ is a $C_{1-20}$ carbenium ion; and $A^-$ is as previously defined. A preferred carbenium ion is the trityl cation, i.e., triphenylmethylium.

A further suitable ion forming, activating cocatalyst comprises a compound which is a salt of a silylium ion and a noncoordinating, compatible anion represented by the formula:

$$R''_3Si^+A^-$$

wherein:

R'' is $C_{1-10}$ hydrocarbyl, and $A^-$ are as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. Ser. No. 08/304,314, filed Sep. 12, 1994.

Certain complexes of alcohols, mercaptans, silanols, and oximes with tris(pentafluorophenyl)borane are also effective catalyst activators and may be used for the present invention. Such cocatalysts are disclosed in U.S. Pat. No. 5,296,433, the teachings of which are herein incorporated by reference.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0 to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

A further recently discovered electrochemical technique for generation of activating cocatalysts is the electrolysis of a disilane compound in the presence of a source of a noncoordinating compatible anion. All of the foregoing techniques are more fully disclosed and claimed in U.S. Ser. No. 08/82,201, filed on Sep. 12, 1994 and published in equivalent form as (WO95/00683). In as much as the activation technique ultimately produces a cationic metal complex, the amount of such resulting complex formed during the process can be readily determined by measuring the quantity of energy used to form the activated complex in the process.

The most preferred activating cocatalysts are trispentafluorophenylborane and N,N-dioctadecyl-N-methylammonium tetrakpentafluorophenylborate. The latter compound being the principal component of a mixture of borate salts derived from bis(hydrogenatedtallow)methylammonium compounds, which mixture may be used as the activating cocatalyst herein.

The catalysts are preferably prepared by contacting the derivative of a Group 4 metal with the tris(pentafluorophenyl)borane in an inert diluent such as an organic liquid. Tris(pentafluorphenyl)borane is a commonly available Lewis acid that may be readily prepared according to known techniques. The compound is disclosed in Marks, et al. *J. Am. Chem. Soc.* 1991, 113, 3623–3625 for use in alkyl abstraction of zirconocenes.

The molar ratio of metal complex: activating cocatalyst employed preferably ranges from 1:10 to 2:1, more preferably from 1:5 to 1.5:1, most preferably from 1:5 to 1:1.

The constrained geometry catalyst can contain either no aluminum cocatalyst or only a small amount (i.e., from about 3:1 Al:M ratio to about 100:1 Al:M ratio) of aluminum cocatalyst. For example, the cationic complexes used as constrained geometry catalysts may be further activated by the use of an additional activators such as an alkylaluminoxane. Preferred co-activators include methylaluminoxane, propylaluminoxane, isobutylaluminoxane, combinations thereof and the like. So-called modified methylaluminoxane (MMAO) is also suitable for use as a cocatalyst. One technique for preparing such modified aluminoxane is disclosed in U.S. Pat. No. 4,960,878 (Crapo et al.), the disclosure of which is incorporated herein by reference. Aluminoxanes can also be made as disclosed in U.S. Pat. No. 4,544,762 (Kaminsky et al.); U.S. Pat. No. 5,015,749 (Schmidt et al.); U.S. Pat. No. 5,041,583 (Sangokoya); U.S. Pat. No. 5,041,584 (Crapo et al.); and U.S. Pat. No. 5,041,585 (Deavenport et al.), the disclosures of all of which are incorporated herein by reference.

The constrained geometry catalysts useful for the production of the ethylene interpolymers of narrow composition and molecular weight distribution may also be supported on an inert support. Typically, the support can be any solid, particularly porous supports such as talc or inorganic oxides, or resinous support materials such as a polyolefin. Preferably, the support material is an inorganic oxide in finely divided form.

Suitable inorganic oxide materials which are desirably employed in accordance with this invention include Group IIA, IIIA, IVA, or IVB metal oxides such as silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the constrained geometry catalyst component added to the reaction slurry. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° C. to about 1000° C., and preferably, from about 300° C. to about 800° C. Pressure considerations are not critical. The duration of the thermal treatment can be from about 1 to about 24 hours; however, shorter or longer times can be employed provided equilibrium is established with the surface hydroxyl groups.

The substantially linear ethylene/α-olefin interpolymers for use in the present invention are interpolymers of ethylene with at least one $C_3$–$C_{20}$ α-olefin and/or $C_4$–$C_{18}$ diolefins. Copolymers of ethylene and 1-octene are especially preferred. The term "interpolymer" is used herein to indicate a copolymer, or a terpolymer, or the like. That is, at least one other comonomer is polymerized with ethylene to make the interpolymer. Other unsaturated monomers usefully copolymerized with ethylene include, for example, ethylenically unsaturated monomers, conjugated or nonconjugated dienes, polyenes, etc. Preferred comonomers include the $C_3$–$C_{20}$ α-olefins especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The Heterogeneous Ethylene/α-Olefin Interpolymer (Component B)

The polymers used to prepare the cast stretch film of the present invention can be blends of heterogeneous broad composition interpolymers with the substantially linear ethylene/α-olefin interpolymers. The heterogeneous component is differentiated from the substantially linear component in that in the latter, substantially all of the interpolymer molecules have the same ethylene/comonomer ratio within that interpolymer, whereas heterogeneous interpolymers are those in which the interpolymer molecules do not have the same ethylene/comonomer ratio. The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks) by DSC. The heterogeneous interpolymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

The Ziegler Catalysts

The Ziegler catalysts suitable for the preparation of the heterogeneous component of the current invention are typical supported, Ziegler-type catalysts which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-sec-butylmagnesium, diisopropylmagnesium, di-n-hexylmagnesium, isopropyl-n-butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides, metallic halides, and hydrogen chloride.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined herein before are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula

$$MR_{y-a}X_a$$

wherein:

M is a metal of Groups IIB, IIIA or IVA of Mendeleev's Periodic Table of Elements, R is a monovalent organic radical, X is a halogen, Y has a value corresponding to the valence of M, and a has a value from 1 to y.

Preferred metallic halides are aluminum halides of the formula

$$AlR_{3-a}X_a$$

wherein:

each R is independently hydrocarbyl as hereinbefore defined such as alkyl,

X is a halogen and a is a number from 1 to 3.

Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts.

The magnesium halide can be performed from the organomagnesium compound and the halide source or it can be formed in situ in which instance the catalyst is preferably prepared by mixing in a suitable solvent or reaction medium (1) the organomagnesium component and (2) the halide source, followed by the other catalyst components.

Any of the conventional Ziegler-Natta transition metal compounds can be usefully employed as the transition metal component in preparing the supported catalyst component. Typically, the transition metal component is a compound of a Group IVB, VB, or VIB metal. The transition metal component is generally, represented by the formulas: $TrX'_{4-q}(OR^1)_q$, $TrX'_{4-q}R^2_q$, $VOX'3$ and $VO(OR^1)_3$.

Tr is a Group IVB, VB, or VIB metal, preferably a Group IVB or VB metal, preferably titanium, vanadium or zirconium, q is 0 or a number equal to or less than 4, X' is a halogen, and $R^1$ is an alkyl group, aryl group or cycloalkyl group having from 1 to 20 carbon atoms, and $R^2$ is an alkyl group, aryl group, aralkyl group, substituted aralkyls, and the like. The aryl, aralkyls and substituted aralkys contain 1 to 20 carbon atoms, preferably 1 to 10 carbon atoms. When the transition metal compound contains a hydrocarbyl group, $R^2$, being an alkyl, cycloalkyl, aryl, or aralkyl group, the hydrocarbyl group will preferably not contain an H atom in the position beta to the metal carbon bond. Illustrative but non-limiting examples of aralkyl groups are methyl, neo-pentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O-i-C_3H_7)_4$, and $Ti(O-n-C_4H_9)_4$.

Illustrative examples of vanadium compounds include $VCl_4$, $VOCl_3$, $VO(OC_2H_5)_3$, and $VO(OC_4H_9)_3$.

Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

As indicated above, mixtures of the transition metal compounds may be usefully employed, no restriction being imposed on the number of transition metal compounds which may be contracted with the support. Any halogenide and alkoxide transition metal compound or mixtures thereof can be usefully employed. The previously named transition metal compounds are especially preferred with vanadium tetrachloride, vanadium oxychloride, titanium tetraisopropoxide, titanium tetrabutoxide, and titanium tetrachloride being most preferred.

Suitable catalyst materials may also be derived from a inert oxide supports and transition metal compounds. Examples of such compositions suitable for use in the solution polymerization process are described in U.S. Pat. No. 5,420,090 (Spencer. et al.), the teachings of which are incorporated herein by reference.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide to be employed in preparing the catalyst compositions, as well as affecting the properties of polymers formed with the aid of the catalyst compositions, these characteristics must frequently be taken into consideration in choosing an inorganic oxide for use in a particular aspect of the invention. In general, optimum results are usually obtained by the use of inorganic oxides having an average particle size in the range of about 1 to 100 microns, preferably about 2 to 20 microns; a surface area of about 50 to 1,000 square meters per gram, preferably about 100 to 400 square meters per gram; and a pore volume of about 0.5 to 3.5 $cm^3$ per gram; preferably about 0.5 to 2 $cm^3$ per gram.

In order to further improve catalyst performance, surface modification of the support material may be desired. Surface modification is accomplished by specifically treating the support material such as silica, alumina or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas and $R^1MgR^2$ and $R^1R^2AlR^3$ wherein each of $R^1$, $R^2$ and $R^3$ which may be the same or different are alkyl groups, aryl groups, cycloalkyl groups, aralkyl groups, alkoxide groups, alkadienyl groups or alkenyl groups. The hydrocarbon groups $R^1$, $R^2$ and $R^3$ can contain between 1 and 20 carbon atoms and preferably from 1 to about 10 carbon atoms.

The surface modifying action is effected by adding the organometallic compound in a suitable solvent to a slurry of the support material. Contact of the organometallic compound in a suitable solvent and the support is maintained from about 30 to 180 minutes and preferably from 60 to 90 minutes at a temperature in the range of 20° to 100° C. The diluent employed in slurrying the support can be any of the solvents employed in solubilizing the organometallic compound and is preferably the same.

The heterogeneous polymer component can also be an ethylene homopolymer or, preferably, an interpolymer of ethylene with at least one $C_3$–$C_{20}$ α-olefin and/or $C_4$–$C_{18}$ diolefins. Heterogeneous copolymers of ethylene and 1-octene are especially preferred.

The Final Ethylene Interpolymer Composition

Ethylene polymer compositions wherein both the homogeneous ethylene polymer and the heterogeneous ethylene polymer are ethylene/α-olefin interpolymers are especially preferred.

A measure for the processability of these materials on a cast film line is given by the viscosity at 100 rad/s. It has been observed that the lower the viscosity at this shear rate, the lower the amps on the machine will be and consequently, the higher the output of the material on this machine can be if the amps are maximized. The interpolymer compositions of the present invention have a viscosity at 100 rad/s which satisfies the following relationship;

Log(viscosity at 100 rad/s)$\leq$4.43–0.8 log($I_2$)

From a processing standpoint it is highly preferred that the viscosity of a material on a cast film line is less than or equal to 10,000 poise at 100 rad/s. The ratio of the viscosity at 0.1 rad/s to the viscosity at 100 rad/s can be used as a measure for the shear sensitivity of the material. The higher this number at a given melt index, the better the processing performance of the material will be on an extrusion line. The melt index ratio $I_{10}/I_2$ can be used in a similar fashion.

Most polymers exhibit shear thinning behavior. This means that with an increase in shear rate the viscosity tends to decrease. Different polymers may have a different shear thinning behavior. This is a very important property as it relates to polymer processing on typical fabrication equipment such as extruders. It is advantageous to have a polymer with a high tendency to shear thinning. At a specific rotation speed of the screw (directly related to the shear rate exerted on the polymer) a polymer with more shear thinning will exhibit a lower viscosity. This will result in a higher output of the extruder, lower amps to rotate the screw and a lower pressure at the die.

It is well known that more shear thinning can be expected for polymers with a broader molecular weight distribution and/or a higher content of long chain branches. It is also a well known fact in the fabrication of cast stretch films that both these factors can have a negative effect on mechanical properties such as on-pallet stretchability and toughness, dart, and puncture. It is therefore necessary to strike a balance such that good mechanical properties are retained with good processing behavior.

A convenient way to describe the relationship between viscosity and shear rate is the well known Bird Carreau equation (N. Gamesh Kumar, J. Polym. Sci. Macromolecular Review, Vol. 15, 255 (1980)):

$$\eta = \frac{\eta_0}{(1 + (\tau \cdot \dot{\gamma})^n)}$$

In this equation $\eta$ is used to represent the viscosity and $\gamma$ the shear rate. $\eta_0$ is termed zero shear viscosity and represents the viscosity of the polymer when no shear would be applied to it. As the polymer is shear thinning, this is the highest viscosity the polymer can achieve. The constant $\tau$ is an average relaxation time for the polymer system. The longer the relaxation time of the polymer, the more shear thinning the polymer will show. The constant n does not have any apparent physical significance.

For cast stretch film materials the melt index ($I_2$) is typically between 1 and 7 and more typically between 2 and 5 g/10 min. For this value range, melt index is directly correlated to the zero shear viscosity for most materials. At these conditions the shear thinning behavior of the material is almost uniquely determined by the average relaxation time $\tau$ and constant n of the polymer.

The interpolymer compositions of the present invention have relaxation times which conform to the following equation;

log($\tau$)>–1.2–1.3 log($I_2$)

The higher relaxation times ensure sufficient shear thinning behavior of the material, while at the same time good mechanical properties are retained.

Preparation of the Final Interpolymer Composition

If blends of a homogeneous ethylene interpolymer with a heterogeneous ethylene polymer are to be used then each component described herein can each be made separately in different reactors, and subsequently blended together to make the interpolymer compositions of the present invention. The novel composition can also manufactured in-situ using any polymerization method and procedure known in the art (including solution, slurry or gas phase polymerization processes at high or low pressures) provided the operations, reactor configurations, catalysis systems and the like are selected, employed and carried out to indeed provide the novel composition with its defined combination of characteristics. Preferably, though, the homogeneous ethylene polymer and the heterogeneous ethylene polymer used in the compositions described herein are made in a multiple reactor scheme, operated either in parallel or in series, or a combination of both where more than two reactors are employed, such as those disclosed in U.S. Pat. No. 3,914, 342 (Mitchell) and WO 94/00500, equivalent to U.S. Ser. No. 07/904,770, as well as U.S. Ser. No. 08/10958, filed Jan. 29, 1993, the teachings of which are hereby incorporated herein by reference. In the multiple reactor scheme, at least one of the reactors makes the homogeneous ethylene interpolymer using a constrained geometry catalyst and at least one of the reactors makes the heterogeneous ethylene interpolymer using a Ziegler catalyst. In a preferred mode of operation, the reactors are operated in a series configuration to make most advantage of the high polymerization temperatures allowed by the Ziegler catalyst. When the reactors are connected in series, the polymerization reaction product formed by the constrained geometry catalyst in the first reactor(s) is fed directly (i.e., sequentially) into a second reactor(s) along with the ethylene/$\alpha$-olefin reactants and Ziegler catalyst and solvent.

In a multiple reactor polymerization system (and especially in a two reactor system) with reactors configured in series, the polymer split is generally greater than or equal to 40 weight percent and preferably in the range of from about 45 weight percent to about 60 weight percent for the first reactor in the series. Preferably, the first component (i.e., the polymer component manufactured in the first reactor of a series) will be characterized by a lower polymer density and high molecular weight relative to the second (or last) component. To ensure this preference, it may be necessary in a continuous polymerization system to provide a higher percent of make-up comonomer feed (e.g., octene) to the second reactor (or any other reactor other than the first reactor in a series).

If the multiple reactor polymerization comprises two reactors, then the polymer mass split to the second reactor in the series will generally be equal to or less than 60 weight percent and preferably in the range of from about 40 weight percent to about 55 weight percent. The first reactor is a series configuration will typically be that reactor situated furthest away from the product outlet to finishing operations.

Also, in a preferred embodiment of the invention, a polymerization system consisting of at least one recirculating flow loop reactor and especially a polymerization system consisting of at least two recirculating loop reactors operated nonadiabatically is employed to manufacture the novel composition. Such preferred polymerization systems are as described by Kao et al. in co-pending application Ser. No. 08/831172, filed Apr. 1, 1997, the disclosure of which is incorporated herein by reference.

The nonadiabatic polymerization is preferably achieved at a continuous volumetric heat removal rate equal to or greater than about 400 Btu/hour*cubic foot*° F. (7.4 kW/m³*° K), more preferably, equal to or greater than about 600 Btu/hour*cubic foot*° F., more especially equal to or greater than about 1,200 Btu/hour*cubic foot*° F. and most especially equal to or greater than about 2,000 Btu/hour*cubic foot*° F.

"Volumetric heat removal rate" as used herein is the process heat transfer coefficient, U, in Btu/hour*square foot*° F., multiplied by the heat exchange area, A, in square feet, of the heat exchange apparatus divided by the total reactor system volume, in cubic feet. One of ordinary skill will recognize that there should be consistency respecting whether process side or outside parameters are used as to U and surface area calculations and determinations. The calculations contained herein are based on outside surface areas and diameters of heat exchange tubes, coils, etc. whether or not the reactor mixture flows through such tubes, coils, etc. or not.

To effectuate nonadiabatic polymerization, any suitable heat exchange apparatus may be used, in any configuration, including, for example, a cooling coil positioned in a polymerization reactor or reactors, a shell-and-tube heat exchanger positioned in a polymerization reactor or reactors wherein the reactor flow stream(s) (also referred to in the art as "reaction mixture") passes through the tubes, or an entire recirculating flow loop reactor being designed as a heat exchange apparatus by providing cooling via a jacket or double piping. In a suitable design, a form of a shell-and-tube heat exchanger can be used wherein the exchanger housing has an inlet and an outlet for the reactor flow stream and an inlet and outlet for heat transfer media (e.g., water, water/glycol, steam, SYLTHERMO™ material or media supplied by The Dow Chemical Company under the designation DOWTHERM®). In another design, the reactor flow stream flows through a plurality of heat transfer tubes within the heat exchanger housing while the heat transfer media flows over the tubes' exterior surfaces transferring the heat of reaction or polymerization from the reactor flow stream. Alternatively, the reaction stream flows through the housing and the heat transfer media flows through the tubes. Suitable heat exchange apparatuses for use in the manufacturing of the novel composition are commercially available items (such as, for example, a static mixer/heat exchanger supplied by Koch) having a tortuous path therethrough defined by the tubes' tubular walls and/or having solid static interior elements forming an interior web through which the reaction mixture flows.

The final interpolymer compositions and their individual components (if isolated) can be stabilized by various additives such as antioxidant(e.g., hindered phenolics (e.g., Irganox™ 1010), phosphite(e.g., Irgafos™ 168), cling additive(e.g., PIB), antiblock additives, pigments, fillers, and the like can also be included in the formulations, to the extent that they do not interfere with the enhanced formulation properties discovered by Applicants. Both Irganox™ and Irgafos™ are made by and trademarks of Ciba Geigy Corporation. Irgafos™ 168 is a phosphite stabilizer and Irganox™ 1010 is a hindered polyphenol stabilize (e.g., tetrakis [methylene 3-(3,5-ditert.butyl-4-hydroxyphenylpropionate)]methane.

Properties of the Individual Components and the Final Interpolymer Compositions a) The Substantially Linear Ethylene Interpolymer (Component A)

The amount of the substantially linear ethylene/α-olefin interpolymer incorporated into the composition of the present invention is from about 10 to about 100 percent, preferably from about 10 to about 90, more preferably from about 35 to about 55 percent, by weight based on the Combined weights of Components A and B.

The density of the substantially linear ethylene/α-olefin interpolymer incorporated into the composition of the present invention is generally from about 0.860 to about 0.925, preferably from about 0.880 to about 0.920, and more preferably from about 0.895 to about 0.915 g/cm³.

The melt index for the substantially linear ethylene/α-olefin interpolymers incorporated into the composition of the present invention is generally from about 0.2 to about 7, preferably from about 0.4 to about 4, more preferably from about 0.5 to about 2 grams/10 minutes (g/10 min).

The $I_{10}/I_2$ ratio of the substantially linear ethylene/α-olefin interpolymers incorporated into the composition of the present invention is greater than or equal to about 5.63.

The $M_w/M_n$ ratio of the substantially linear ethylene/α-olefin interpolymers incorporated into the composition of the present invention is preferably from about 1.8 to about 3.0.

b) The Heterogeneous Interpolymer (Component B)

The amount of the heterogeneous interpolymer incorporated into the composition of the present invention is from about 0 to about 90 percent, preferably from about 10 to about 90, more preferably from about 45 to about 65 percent, by weight based on the combined weights of Components A and B.

The density of the heterogeneous interpolymers incorporated into the composition of the present invention is generally from about 0.895 to about 0.955, preferably from about 0.900 to about 0.945, more preferably from about 0.910 to about 0.935 g/cm³.

The melt index ($I_2$) of the heterogeneous interpolymers incorporated into the composition of the present invention is generally from about 0.20 to about 500, preferably from about 0.40 to about 250, more preferably from about 0.50 to about 50 g/10 min.

c) The Final Ethylene Interpolymer Composition

The density of the interpolymer compositions of the present invention is generally from about 0.910 to about 0.922, preferably from about 0.912 to about 0.920, and more preferably from about 0.915 to about 0.919 g/cm³.

The melt index of the interpolymer compositions of the present invention is of from about 0.5 to about 10.0, more preferably of from about 1 to about 10, and even more preferably of from about 2.0 to about 6.0 grams/10 minutes (g/10 min).

The $I_{10}/I_2$ ratio of the interpolymer compositions of the present invention is typically less than about 10.0, preferably less than about 9.0, more preferably less than about 8.0.

The interpolymer compositions of the present invention have viscosities which obey the following relationship:

$$\text{Log(viscosity at 100 rad/s)} \leq 4.43 - 0.8 \log(I_2)$$

The interpolymer compositions of the present invention also have relaxation times which obey the following relationship:

$$\log(\tau) > -1.2 - 1.3 \log(I_2)$$

The preferred interpolymer compositions of the present invention have two distinct peaks in the ATREF curve; wherein the ratio of the viscosity average molecular weight at the peak having the highest elution temperature ($Mv_2$) to the viscosity average molecular weight at the peak having the lowest elution temperature ($Mv_1$) conforms to the following relationship;

$$Mv_1/Mv_2 \leq 1;$$

and where $T_2$ is the elution temperature of the highest crystallization peak and $T_1$ is the elution temperature of the lowest crystallization peak and;

$$T_2-T_1 \leq 25° C.$$

The preferred interpolymer compositions of the present invention also have a molecular weight distribution which conforms to the following relationship;

$$M_w/M_n \leq 3.$$

EXAMPLES

Test Methods
Density and Melt Flow Measurements

The density of the substantially linear ethylene/α-olefin is measured in accordance with ASTM D-792. The molecular weight of the substantially linear ethylene/α-olefin interpolymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear.

Another measurement useful in characterizing the molecular weight of the linear or the substantially linear ethylene/α-olefin polymers is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer.

Molecular Weight Distribution Determination

The whole interpolymer product samples and the individual interpolymer components are analyzed by gel permeation chromatography (GPC) on a Waters 150C high temperature chromatographic unit equipped with mixed porosity columns, operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene}=a*(M_{polystyrene})^b.$$

In this equation, a=0.4316 and b=1.0. Weight average molecular weight, $M_w$, and number average molecular weight, $M_n$, is calculated in the usual manner according to the following formula:

$$M_j=(\Sigma w_i(M_i^j))^j;$$

where $w_i$ is the weight fraction of the molecules with molecular weight $M_i$ eluting from the GPC column in fraction i and j=1 when calculating $M_w$, and j=−1 when calculating $M_n$.

Analytical Temperature Rising Elution Fractionation/Differential Viscometry (ATREF/DV)

The interpolymer compositions of the present invention were analyzed using Analytical Temperature Rising Elution Fractionation (ATREF) in combination with high temperature continuous viscometry as described in U.S. Pat. Nos. 4,798,081 and 5,008,204 the entire content of which are herein incorporated by reference. This technique comprises a method for fractionating crystalline and semi-crystalline polymers as a function of the short chain branching content via ATREF and determining continuously the viscosity average molecular weight, Mv, of the fractions.

Typically, the polymer sample (dissolved in hot trichlorobenzene) was crystallized in a column containing an inert support (steel shot) by slowly reducing the temperature. An ATREF chromatogram was then generated by eluting the crystallized sample from the column by slowly increasing the temperature of the eluting solvent, trichlorobenzene. The ATREF curve illustrated several key structural features of the resin. For example, the response from the refractive index detector gives the short chain branching distribution; while the response from the differential viscometer detector provides an estimate of the viscosity average molecular weight.

Thus the term "ATREF peak temperature", Tx, as used herein refers to the elution temperature that corresponds to a peak observed on an ATREF curve as determined from temperature rising elution fractionation in the range of 20 to 110° C. A "peak" corresponds to a substantial weight percent of crystallized polymer portion based on the total amount of crystallizable polymer portions for the whole composition. For the purposes of the present invention, an ATREF peak is discerned as distinguished from shoulders, humps, doublets or multiplets.

For the inventive compositions, $T_1$ will be the temperature of elution of the peak occurring at the lowest elution temperature and $T_2$ will be the temperature of elution of the peak occurring at the highest elution temperature in the range of 20 to 110° C.

The term $M_{v1}$ as used herein refers to the viscosity average molecular weight of the material corresponding to the peak having the lowest elution temperature, $T_1$, in the ATREF curve, and the term $M_{v2}$ as used herein refers to the viscosity average molecular weight of the material corresponding to the peak having the highest elution temperature, $T_2$, in the ATREF curve.

Rheological Analysis

The rheological analyses were performed on a dynamic mechanical spectrometer such as the RDA II, RDSII or RMS 800 from Rheometrics. Samples were obtained via compression molding pellets or granules. Compression molding to form homogeneous plaques was performed according to ASTM D 1928. A typical temperature for polyethylene ranges from 180 to 190° C. Sample disks were prepared with a diameter of 25 mm and a thickness between 1–4 mm using the 25 mm diameter parallel plates configuration.

The rheology of the sample was measured using a dynamic frequency sweep. The measurement temperature is 190° C. The frequency interval is 0.1 to 100 radians/sec, strain 10%, sweep mode logarithmic and 5 points per decade.

The rheometer oven was allowed to come to the temperature equilibrium, which may take about 30 minutes to 1 hr.

Subsequently, a delay time of 300 seconds was allowed. After opening the oven, the sample was inserted between the plates. After 1 minute the plates were lowered and the gap brought to 1.8 to 2 mm. The total time elapsed between sample insertion and final gap setting did not exceed 3 minutes. Three minutes after start, the oven was opened and the sample trimmed. A delay of 5 minutes before start of the measurement normally was sufficient to bring the temperature back to the set-point. The analysis was then started and the constants $\eta_0$, $\tau$ and n determined in a non-linear least squares procedure using equation 1 in its logarithmic form.

$$\eta = \frac{\eta_0}{(1 + (\tau \cdot \dot{\gamma})^n)} \quad \text{I}$$

Example 1

Example 1 was produced as an in-reactor blend under the process conditions found in Table 1 and with product specifications as found in Table 2.

TABLE 1

| Process Data | | |
|---|---|---|
| | Reactor 1 | Reactor 2 |
| Process Temperature, (° C.) | 108 | 200 |
| Process Pressure, (psig) | 535 | 535 |
| Polymer Concentration (wt. %) | 14 9 | 21 24 |
| C$_2$ Conversion, % (overall) | 74 | 90 (95) |
| Solvent/C$_2$ feed ratio | 5 | 2 8 |
| Solvent flow, (lbs./hr) | 750 | 210 |
| C$_2$ flow, (lbs./hr) | 150 | 75 |
| Make-up C$_8$ flow, (lbs./hr) | 0 | 29 |
| Fresh Hydrogen flow, (sccm) | 710 | 1850 |
| Feed Temp, (° C.) | 15 | 15 |
| Recycle Ratio | 12 2 | 8 6 |
| Polymer split, (weight %) | 53 3 | 46 7 |
| Residence time, (min) | 16 5 | 10 3 |
| Catalyst Type | Constrained Geometry Catalyst system | Heterogeneous Ziegler-Natta Catalyst system |
| Volumetric Heat Removal rate, (BTU/hr*ft$^3$*° F.) | 400 | 500 |
| Production rate, (lbs./hr) (overall) | 134 | 118 (252) |

The Constrained Geometry Catalyst is (t-butylamido) dimethyl(tetramethylcyclopentadienyl)titanium (II) 1,3-pentadiene used with tris(pentafluorophenyl)borane in a B:Ti ratio of 3:1 with a MMAO scavenger in an Al:Ti ratio of 5:1. The heterogeneous catalyst system is a Ziegler Natta catalyst system prepared substantially according to U.S. Pat. No. 4,612,300 (Ex. P.), by sequentially adding to a volume of an isoparaffin fluid hydrocarbon solvent commercially available from ExxonMobil Corp. under the trade designation Isopar E, a slurry of anhydrous magnesium chloride in the hydrocarbon solvent, a solution of EtAlCl$_2$ in hexane, and a solution of Ti(O-iPr)$_4$ in the hydrocarbon solvent to yield a composition containing a magnesium concentration of 0.17M and a ratio of Mg/Al/Ti of 40/12/3. An aliquot of this composition containing 0.064 mmol of Ti which was treated with a dilute solution of Et$_3$Al to give an active catalyst with a final Al/Ti ratio of 8/1. This slurry was then transferred to a syringe until it was required for injection into the polymerization reactor.

A cast film was fabricated on an Egan coextrusion cast film line consisting of a 2.5 in. 24:1 L/D Egan extruder, a 3.5 in. 32:1 L/D Egan extruder and a 2.0 in. 24:1 L/D Davis Standard extruder. A Dow design A/B/C feedblock and a 30 in. Johnson coat hanger, flex lip with a 0.020 in. die gap were utilized during this evaluation. Extruder barrel temperatures were adjusted based on the resin and pumping rates to maintain a constant melt temperature. The die zone temperatures corresponded to the polymer melt temperature, approx. 525 degrees F. Line speeds were controlled at 600 fpm by the CMR 2000 microprocessor while film thickness (0.8 mil) was achieved by varying extruder rpm at constant layer ratios. Each resin sample was evaluated at a specific air gap with air gap being defined as the distance the film travels from the die exit to the contact point on the primary chill roll. This contact point is always located at the 9 o'clock position on the primary chill roll. The air gap is a very important extrusion parameter for the performance properties of cast film resin as it determines the degree of orientation in the film. The smaller the air gap, the more oriented the film will be the poorer the performance.

Viscosities were measured on an Rheometrics Mechanical Spectrometer at 190° C. in the oscillatory mode. On-pallet stretchability (OPS) was determined using a Lantech Model SHC Film Test Stretch Wrapper. In a Dow developed test, on-pallet stretchability is the point at which the film fails between the prestretch rollers as the percentage of prestretch is increased at constant dancer bar tension of 10 lb. At the same time the resistance of this wrapped film against puncture should be as high as possible in order to improve abuse resistance. On-pallet puncture (OPP) determines the ability of a material to withstand protrusion from sharp objects on the pallet. In this Dow test, it is measured by placing a 12" long probe on the pallet frame which is turning at 9 rpm. The film is allowed to wrap the pallet frame below the probe until 250% pre-stretch is reached and the dancer bar tension has been adjusted to 10 lbs force. While the pallet is rotating, the roll carriage is raised until the film is centered on the probe. If the film does not fail before 3 wraps are obtained, the dancer bar tension is increased in unit steps until failure occurs. Combinations of preferably as high as about 12 lbs OPP with 250% OPS are typical for Ziegler Natta type copolymers of 2.3 I$_2$ and density of 0.917 g/cm$^3$. Combinations of higher values are highly desirable. A measure of the film's toughness in the unstretched state is dart impact strength. Dart impact B was measured according to ASTM D-1709.

Example 1 has a melt index I$_2$ of 3.17, a ratio of I$_{10}$/I$_2$ of 6.53 and a density of 0.9181 g/cm$^3$. Its MWD as measured by M$_w$/M$_n$ is 2.39. The ratio of the viscosity at 0.1 rad/s to the viscosity at 100 rad/s was measured to be 2.44, its viscosity at 100 rad/s is 12300 poise, the average relaxation time is 0.02046 s, its % HD is 8.7 and the CDBI was 60.95%. This material has an on-pallet puncture resistance of 15 lbs and its ultimate elongation is 320%., the dart B impact strength is 530 g, when analyzed after fabricating the film at a 3" air gap (Run 6, Table 3).

Examples 2 to 4

Examples 2 to 4 were prepared as in-reactor blends in a similar manner as for Example 1 and with product specifications as presented in Table 2. As can be noticed, the resulting polymer is significantly different from Example 1. Example 2 is a lower density version of example 1 (overall density is 0.9118 instead of 0.9181 g/cm$^3$). Although the substantially linear component's melt index and density are different from those of Example 1, the resulting polymer has a very narrow molecular weight distribution per M$_w$/M$_n$, relatively low I$_{10}$/I$_2$ and ratio of the viscosity at 0.1 rad/s to the viscosity at 100 rad/s, viscosity at 100 rad/s, average relaxation time, % HD and relatively high CDBI (2.82, 6.77, 8791 poise, 0.01842 s, 2.13, 8.2% and 59.39% respectively). When fabricated under conditions similar to those of Example 1, its performance is very similar. Furthermore, this example is relatively insensitive to changes in air gap from 3" to 4" (Runs 7 and 8 of Table 3) and hence changes in orientation).

Example 3 has broader molecular weight distribution per $M_w/M_n$, high $I_{10}/I_2$ and ratio of the viscosity at 0.1 rad/s to the viscosity at 100 rad/s, good processability as per the viscosity at 100 rad/s and average relaxation time, and low CDBI with high % HD (3.4, 7.86, 3.39, 9506, 0.0499 s and 34.4% with 20.8% respectively). When fabricated under conditions similar to those of Example 1 and compared back to back to the comparative experiments, this material has specifically good impact values with a good combination of OPP and OPS, at excellent processability (see Table 3).

Example 4 has a combination of high melt index and density (3.6 g/10 min and 0.9181 g/cm$^3$, respectively) in comparison to Examples 1 to 3. Its molecular weight distribution ($M_w/M_n$), high $I_{10}/I_2$ and ratio of the viscosity at 0.1 rad/s to the viscosity at 100 rad/s, viscosity at 100 rad/s, average relaxation time and low CDBI with high % HD are 3.12, 7.62, 2.79, 7441, 0.0286 s and 42.36% with 15.2% respectively. Apart from a much improved processability (viscosity at 100 rad/s), this material has the highest OPS observed in this series (345%), with OPP and dart still similar to a lower melt index Ziegler Natta material (Comparative Experiment A).

Examples 5 and 6

Examples 5 and 6 are two substantially linear homogeneous ethylene interpolymers materials produced by the Dow Chemical. These materials have a very narrow composition (CDBI of 73.50 and 80.15, respectively and no HD fraction) and a molecular weight distribution of 2.14 and 2.16, respectively, typical of substantially linear ethylene/α-olefin interpolymers. Because of the presence of long chain branching they also have very good processability on the extruder ($I_{10}/I_2$, ratio of viscosity at 0.1 rad/s to viscosity at 100 rad/s, viscosity at 100 rad/s and average relaxation time are 7.5, 3.44, 10838 poise, 0.1189 s and 8.6, 4.37,8917 poise, 0.2147 s, respectively). But, when fabricated and measured in the same way as described for Example 3 (Table 3, Runs 1 to 4), they show similar on-pallet stretchability and dart impact B. Specifically Example 6 is improved relative to Examples 3 and 5 in that its processability (as indicated by its viscosity at 100 rad/s) is significantly better. As for Example 3, Example 6 has good impact values with a good combination of OPP and OPS, and excellent processability in comparison to Comparative experiments D and E.

Examples 7–15

Examples 7 to 15 are additional in reactor blends produced as for Example 1 and with product specifications as presented in Table 2b. The rheological properties are presented in Table 4. All examples conform to equation $$\log(\tau) > -1.2 - 1.3 \log(I_2)$$

As a result, improved shear thinning and therefore good processability can be expected.

Comparative Experiment A

This commercially available Ziegler Natta produced material, sold as Dowlex™ 3347A, an ethylene/1-octene copolymer produced by The Dow Chemical Company, is, when fabricated and measured in the same way as described for Example 3, clearly inferior to the examples of the present invention. Specifically, in one case, its OPP, OPS and dart B is 15 lbs, 290% and 116 g respectively, in comparison to 19 lbs, 290% and 656 g for Example 3 (Runs 1 and 3 of Table 3 respectively). In another case, its OPP and OPS is 12.5 lbs and 265% respectively, in comparison to 15 lbs and 275% for Example 3 (Run 3 of Table 3). The viscosity at 100 rad/s is relatively high (11700 poise). Consequently, line speeds on the fabrication line will be lower for this resin in comparison to Examples 2 to 4.

Comparative Experiment B

Comparative Experiment B is a substantially linear interpolymer produced by the Dow Chemical Company, with low levels of long chain branching which results in a very low $I_{10}/I_2$ (5.73), a low ratio of viscosity at 0.1 rad/s to viscosity at 100 rad/s (1.79) and poor processability (viscosity at 100 rad/s is 14000 poise and average relaxation time is 0.0071 s). Its on-pallet performance is however very similar to that of Examples 1 and 5, both of which have better processability (Table 3, Run 6)

Comparative Experiment C

Comparative Experiment C was produced as an in-reactor blend and fabricated as for Example 1 and has the product specifications presented in Table 2. This resin does not show the similar performance improvements as presented in Examples 1 to 4 (Table 3, Run 5) due to the broad molecular weight distribution ($M_w/M_n$ is 4.75) and high $I_{10}/I_2$.

Comparative Experiments D and E

Comparative Experiment D is the commercial resin EXCEED™ ECD 301 1 and Comparative Experiment E is the commercial resin EXCEED™ ECD 401, both are ethylene/1-hexene copolymers produced by EXXON and identified as a metallocene LLDPE. The composition and molecular weight distribution of EXCEED™ ECD 301 and 401 are slightly broader than those of the substantially linear interpolymers, but the processability is significantly poorer as shown by the $I_{10}/I_2$, the viscosity at 100 rad/s, average relaxation time and the ratio of the viscosity at 0.1 rad/s to the viscosity at 100 rad/s (6, 11007 poise, 0.008 s, 1.82 and 6.04, 10067, 0.0058, 1.67, respectively). To improve on the overall processability of EXCEED™ ECD 301, it is believed that the resin manufacturer has introduced fluoroelastomer processing aids to this resin, as indicated by the presence of 150 ppm fluorine. When fabricated and measured in the same way as described for Example 1, the material exhibits excellent on-pallet performance. EXCEED™ ECD 301 is relatively sensitive to changes in air gap from 3" to 4" (Table 3, runs 7 and 8).

Comparative Experiments F–N

Comparative Experiments F–N are ethylene/1-hexene copolymers and are available on the market as metallocene LLDPE's or m-LLDPE's. Among the examples are materials used in cast film applications: Comparative Experiment F is EXCEED™ ECD 202, Comparative Experiments G to I are SP0540, SP1540 and SP2040 produced by Mitsui Petrochemical. Some materials are used in blown film applications. Comparative Examples J to K are EXCEED™ 350L65, 350D60, 377D60 and 399L60 all produced by EXXON. These m-LLDPE's are known to process poorer than standard Ziegler Natta materials. This is reflected in their rheological properties, summarized in Table 4, with none of the materials fulfilling the above equation between average relaxation time and melt index.

TABLE 2a

Material Characteristics

| Overall | | Example 1 | Example 2 | Example 3 | Example 4 | Example #5 | Example #6 | Comp Experiment A* | Comp Experiment B* | Comp Experiment C* | Comp Experiment D* | Comp Experiment E* |
|---|---|---|---|---|---|---|---|---|---|---|---|---|
| $I_2$ | g/10 min | 3.17 | 3.51 | 2.7 | 3.6 | 2.8 | 2.7 | 2.3 | 3.11 | 3.7 | 3.4 | 4.7 |
| $I_{10}/I_2$ | — | 6.53 | 6.77 | 7.86 | 7.62 | 7.5 | 8.6 | 7.8 | 5.73 | 10.4 | 6 | 6.04 |
| density | g/cm³ | 9181 | 9118 | 9187 | 9188 | .9177 | 9145 | 917 | 9169 | 9156 | 917 | 9162 |
| Additives/AO | | | | | | | | | | | | |
| PEPQ¹ | ppm | 800 | 800 | 800 | 800 | 800 | 800 | 800 | 800 | 800 | | |
| Irganox² 1010 | ppm | 500 | 500 | 500 | 500 | 500 | 500 | 500 | 500 | 500 | 1356 | 1907 |
| Irganox 1076 | ppm | | | | | | | | | | | |
| Irgafos 168 | ppm | 1250 | 1250 | 1250 | 1250 | 1250 | 1250 | 1250 | 1250 | 1250 | 1117 | 1821 |
| Ca stearate | ppm | | | | | | | | | | | |
| Fluorine content | ppm | | | | | | | | | 40 | 150 (250) | none |
| Target SLEP fraction** | % | 53.28 | 51.17 | 38.1 | 40.5 | — | — | — | — | 167 | | |
| Split | % | | | | | | | | | | | |
| $I_2$³ | g/10 min | 72 | 1.8 | 22 | 68 | — | — | — | — | 167 | — | — |
| density³ | g/cm³ | 9092 | 905 | 900 | 899 | — | — | — | — | 8986 | — | — |
| Overall GPC data | | | | | | | | | | | | |
| $M_n$ | g/mole | 32800 | 24400 | 26800 | 23700 | 35300 | 30500 | 24400 | 37500 | 17100 | 39200 | 36400 |
| $M_w/M_n$ | — | 2.39 | 2.82 | 3.40 | 3.12 | 2.14 | 2.16 | 3.4 | 1.87 | 4.75 | 2.24 | 2.27 |
| Rheological Data | | | | | | | | | | | | |
| η @ 1 rad/s/η @ 100 rad/s | — | 2.44 | 2.13 | 3.39 | 2.79 | 3.44 | 4.37 | 2.97 | 1.79 | 4.32 | 1.82 | 1.67 |
| η @ 100 rad/s | Poise | 12300 | 9677 | 9506 | 7441 | 10838 | 8917 | 11700 | 14000 | 6908 | 11007 | 10067 |
| logη @ 100 rad/s | | 4.09 | 3.99 | 3.98 | 3.87 | 4.03 | 3.95 | 4.07 | 4.15 | 3.84 | 4.04 | 4.00 |
| 4.43–0.8log$I_2$ | | 4.03 | 3.99 | 4.08 | 3.98 | 4.07 | 4.08 | 4.14 | 4.04 | 3.97 | 4.00 | 3.89 |
| log(η₀) | | 4.49 | 4.382 | 4.528 | 4.334 | 4.637 | 4.668 | 4.554 | 4.403 | 4.501 | 4.304 | 4.218 |
| τ | s | 0.02046 | 0.01842 | 0.04990 | 0.0286 | 0.1189 | 0.2147 | 0.0328 | 0.0071 | 0.0886 | 0.0080 | 0.0058 |
| n | | 0.5606 | 0.6404 | 0.5729 | 0.6115 | 0.4448 | 0.4739 | 0.6100 | 0.6649 | 0.5799 | 0.78345 | 0.8192 |
| ATREF/DV Data | | | | | | | | | | | | |
| High Density Fraction | % | 8.7 | 8.2 | 20.8 | 15.2 | 0 | 0 | 12.3 | 0 | 8.8 | 0.2 | 1.7 |
| CDBI | % | 60.95 | 59.39 | 34.4 | 42.36 | 73.50 | 80.15 | Not measured | 74.13 | 56.32 | 65.1 | 58.12 |

¹PEPQ is a tradename of SANDOZ Chemical, the primary ingredient of which is believed to be tetrakis-(2,4-di-tertbutyl-phenyl)-4,4' biphenylphosphonite
²Irganox is a tradename of Ciba Geigy
³Value predicted based on a kinetic model although a mass balance model would also suffice where direct measurement is not convenient
*Not an example of the present invention.
**SLEP is the Substantially Linear Ethylene/α-Olefin Interpolymer Component TABLE 2b Material Characteristics

| Overall | | Example 7 | Example 8 | Example 9 | Example 10 | Example 11 | Example 12 | Example 13 | Example 14 | Example 15 |
|---|---|---|---|---|---|---|---|---|---|---|
| $I_2$ | g/10 min | 2.86 | 4.59 | 4.95 | 4.82 | 4.8 | 4.87 | 2.30 | 3.32 | 3.47 |
| $I_{10}/I_2$ | — | 7.61 | 6.6 | 6.51 | 6.46 | 6.48 | 6.64 | 7.04 | 6.92 | 6.92 |
| density | g/cm$^3$ | 9171 | 9131 | 9182 | 9184 | 9182 | 9177 | 917 | 915 | 915 |
| Additives/AO | | | | | | | | | | |
| PEPQ$^1$ | ppm | 800 | 800 | 800 | 800 | 800 | 800 | | | |
| Irganox$^2$ 1010 | ppm | | | | | | | | | |
| Irganox 1076 | ppm | 500 | 500 | 500 | 500 | 500 | 500 | 500 | 500 | 500 |
| Irgafos 168 | ppm | | | | | | | 1200 | 1200 | 1200 |
| Ca stearate | ppm | 1250 | 1250 | 1250 | 1250 | 1250 | 1250 | 1250 | 1250 | 1250 |
| Fluorine content | ppm | | | | | | | | | |
| Target SLEP fraction* | | | | | | | | | | |
| Split | % | 40.19 | 51.17 | 53.27 | 50.2 | 50.2 | 51.55 | 50.9 | 50.5 | 50.5 |
| $I_2$ | g/10 min | 31 | 1.8 | 3.02 | 2.168 | 2.168 | 2.74 | 1.07 | 1.8 | 1.8 |
| density | g/cm$^3$ | 8992 | 905 | 9115 | 9117 | 9117 | 9128 | 91 | 9093 | 9093 |
| Overall GPC data | | | | | | | | | | |
| $M_n$ | g/mole | 22500 | 24600 | 27400 | 30100 | 27500 | 28000 | 34900 | 30400 | 30900 |
| $M_w/M_n$ | — | 3.14 | 2.61 | 2.58 | 2.53 | 2.60 | 2.51 | 2.41 | 2.73 | 2.81 |
| Rheological Data | | | | | | | | | | |
| η @ 1 rad/s/η @ 100 rad/s | — | 3.16 | 2.12 | 2.01 | 2.08 | 2.1 | 2.09 | 3 | 2.43 | 2.44 |
| η @ 100 rad/s | Poise | 10800 | 8791 | 7755 | 8474 | 8779 | 7964 | 11400 | 9344 | 9810 |
| logη @ 100 rad/s | | 4.03 | 3.94 | 3.89 | 3.93 | 3.94 | 3.90 | 4.06 | 3.97 | 3.99 |
| 4.43–0.8log$I_2$ | | 4.06 | 3.90 | 3.87 | 3.88 | 3.88 | 3.88 | 4.14 | 4.01 | 4.00 |
| log ($\eta_0$) | | 4.548 | 4.279 | 4.204 | 4.258 | 4.274 | 4.229 | 4.555 | 4.371 | 4.399 |
| τ | s | 0.04328 | 0.01248 | 0.01101 | 0.0124 | 0.0124 | 0.0121 | 0.0403 | 0.0202 | 0.0211 |
| n | | 0.5426 | 0.6661 | 0.5900 | 0.5685 | 0.5667 | 0.6070 | 0.5393 | 0.5787 | 0.5893 |
| ATREF/DV Data | | | | | | | | | | |
| $T_1$ | C | | 77 | 80 | 80 | 80 | 79 | 75 | | |
| $T_2 - T_1$ | C | | 21 | 17 | 18 | 18 | 19 | 24 | | |
| $M_{v1}/M_{v2}$ | | | 0.670 | 0.699 | 0.686 | 0.728 | 0.577 | 0.629 | | |

*SLEP is the <u>S</u>ubstantially <u>L</u>inear <u>E</u>thylene/α-Olefin Inter<u>p</u>olymer Component TABLE 2c Material Characteristics

| Overall | | Comparative Experiment F | Comparative Experiment G | Comparative Experiment H | Comparative Experiment I | Comparative Experiment J | Comparative Experiment K | Comparative Experiment L | Comparative Experiment M |
|---|---|---|---|---|---|---|---|---|---|
| $I_2$ | g/10 min | 2.2 | 4.0 | 4.0 | 4.0 | 1.08 | 85 | 98 | 74 |
| $I_{10}/I_2$ | — | | 6.0 | NA | N.A | N A | 5.75 | 7.66 | 5.66 | 5.65 |
| density | g/cm$^3$ | 917 | 905 | 915 | 920 | 917 | 917 | 9232 | 9274 |
| Additives/AO | | | | | | | | | |
| PEPQ$^1$ | ppm | | | NA | NA | NA | 219 | | |
| Irganox$^2$ 1010 | ppm | | | NA | NA | NA | 1555 | 1032 | 1242 | 1462 |
| Irganox 1076 | ppm | | 1998 | NA | NA | NA | | | |
| Irgafos 168 | ppm | | 2116 | NA | NA | NA | | | |
| Weston 399 | ppm | | | NA | NA | NA | 1592 | 1283 | 1502 | 1529 |
| Ca stearate | ppm | | | NA | NA | NA | | | |
| Fluorine content | ppm | 253 | | NA | NA | NA | 294 | | |

TABLE 2c-continued

Material Characteristics

| Overall | | Comparative Experiment F | Comparative Experiment G | Comparative Experiment H | Comparative Experiment I | Comparative Experiment J | Comparative Experiment K | Comparative Experiment L | Comparative Experiment M |
|---|---|---|---|---|---|---|---|---|---|
| Overall GPC data | | | | | | | | | |
| $M_n$ | g/mole | 42800 | 29800 | 29900 | 29300 | 51000 | 32600 | NA | NA |
| $M_w / M_n$ | — | 2.2 | 2.58 | 2.59 | 2.56 | 2.13 | 3.046 | NA | NA |
| Rheological Data | | | | | | | | | |
| $\eta$ @ 1 rad/s/$\eta$ @ 100 rad/s | — | 1.97 | 1.73 | 1.75 | 1.59 | 2.79 | 3.60 | 2.94 | 3.36 |
| $\eta$ @ 100 rad/s | Poise | 15100 | 9218 | 9428 | 9329 | 27668 | 20131 | 22987 | 26835 |
| log$\eta$ @ 100 rad/s | | 4.18 | 3.96 | 3.97 | 3.97 | 4.44 | 4.30 | 4.36 | 4.43 |
| 4.43–0.8log$I_2$ | | 4.16 | 3.95 | 3.95 | 3.95 | 4.40 | 4.49 | 5.24 | 4.53 |
| log ($\eta_0$) | | 4.3216 | 4.2018 | 4.2201 | 4.1862 | 4.8931 | 4.8715 | 4.8398 | 4.9648 |
| $\tau$ | s | 0.0082 | 0.0069 | 0.0072 | 0.0054 | 0.0225 | 0.0476 | 0.0245 | 0.0321 |
| n | | 0.8073 | 0.8229 | 0.7981 | 0.8378 | 0.7454 | 0.6252 | 0.7761 | 0.7606 |

N.A.: not available

TABLE 3

Film and Stretch Wrap Properties

| | | Example 1 | Example 2 | Example 3 | Example 4 | Example #5 | Example #6 | Comp Experiment A* | Comp Experiment B* | Comp Experiment C* | Comp Experiment D* | Comp. Experiment E* |
|---|---|---|---|---|---|---|---|---|---|---|---|---|
| Run # (air gap) | | | | | | | | | | | | |
| Run 1, (3 5") | OPP[1] lbs | | | 19 | | 18 | 18 | 15 | | | | 21 |
| | OPS[2] % | | | 290 | | 300 | 300 | 290 | | | | 295 |
| | DartB g | | | 656 | | 254 | 638 | 116 | | | | >850 |
| Run 2, (3") | OPP lbs | | | 13 | | 15 | 13 | | | | | |
| | OPS % | | | 260 | | 265 | 265 | | | | | |
| | DartB g | | | 288 | | 284 | 292 | | | | | |
| Run 3, (5") | OPP lbs | | | 15 | | 16 | 15 | 12.5 | | | 17 | 18 |
| | OPS % | | | 275 | | 270 | 270 | 265 | | | 285 | 280 |
| | DartB g | | | >850 | | 328 | 396 | not meas | | | not meas | not meas |
| Run 4, (7") | OPP lbs | | | 15 | | 17 | 17 | | | | | |
| | OPS % | | | 280 | | 280 | 280 | | | | | |
| | DartB g | | | >850 | | >850 | >850 | | | | | |
| Run 5, (5") | OPP lbs | | | 13 | 14 | | | | | | 12 | |
| | OPS % | | | 315 | 345 | | | | | | 300 | |
| | DartB g | | | 674 | 216 | | | | | | 326 | |
| Run 6, (3") | OPP lbs | | 15 | 12 | 12 | 16 | | | 15 | | | |
| | OPS % | | 320 | 300 | 345 | 310 | | | 310 | | | |
| | DartB g | | 530 | 610 | 184 | 271 | | | >850 | | | |
| Run 7, (3") | OPP lbs | | | 16 | | | | | | | 1.35 | |
| | OPS % | | | 290 | | | | | | | 275 | |
| | DartB g | | | >850 | | | | | | | 310 | |
| Run 8, (4") | OPP lbs | | | 16 | | | | | | | 18 | |
| | OPS % | | | 290 | | | | | | | 300 | |
| | DartB g | | | >850 | | | | | | | >850 | |

Note:
[1]OPP is On-Pallet Puncture Resistance
[2]OPS is On-Pallet Stretchability
*Not an example of the present invention

TABLE 4

Rheology Data

| Example # | $I_2$ (g/10 min) | $I_{10}/I_2$ Ratio | log ($\eta_0$) | $\tau$ (s) | n | log $\tau$ | -1.2-1.3* log $I_2$ |
|---|---|---|---|---|---|---|---|
| Example 1 | 3.17 | 6.53 | 4.49 | 0.02046 | 0.5606 | -1.69 | -1.85 |
| Example 2 | 3.51 | 6.77 | 4.382 | 0.01842 | 0.6404 | -1.73 | -1.91 |
| Example 3 | 2.70 | 7.86 | 4.5276 | 0.0499 | 0.5729 | -1.30 | -1.76 |
| Example 4 | 3.83 | 7.68 | 4.3343 | 0.0286 | 0.6115 | -1.54 | -1.96 |
| Example 5 | 2.80 | 7.50 | 4.6369 | 0.1189 | 0.4448 | -0.92 | -1.78 |
| Example 6 | 2.70 | 8.60 | 4.6680 | 0.2147 | 0.4739 | -0.67 | -1.76 |
| Example 7 | 2.86 | 7.61 | 4.548 | 0.04328 | 0.5426 | -1.36 | -1.79 |
| Example 8 | 4.59 | 6.60 | 4.279 | 0.01248 | 0.6661 | -1.90 | -2.06 |
| Example 9 | 4.95 | 6.51 | 4.204 | 0.01101 | 0.5900 | -1.96 | -2.10 |
| Example 10 | 4.82 | 6.46 | 4.2577 | 0.0124 | 0.5685 | -1.91 | -2.09 |
| Example 11 | 4.80 | 6.48 | 4.2738 | 0.0124 | 0.5667 | -1.91 | -2.09 |
| Example 12 | 4.87 | 6.64 | 4.2286 | 0.0121 | 0.6070 | -1.92 | -2.09 |
| Example 13 | 2.30 | 7.04 | 4.5555 | 0.0403 | 0.5393 | -1.39 | -1.67 |
| Example 14 | 3.32 | 6.92 | 4.3706 | 0.0202 | 0.5787 | -1.69 | -1.88 |
| Example 15 | 3.47 | 6.92 | 4.3993 | 0.0211 | 0.5893 | -1.68 | -1.90 |
| Comp Exp. A | 2.30 | 7.80 | 4.5543 | 0.0328 | 0.6100 | -1.48 | -1.67 |
| Comp Exp. B | 3.11 | 5.73 | 4.403 | 0.0071 | 0.6649 | -2.15 | -1.84 |
| Comp Exp. C | 3.64 | 10.04 | 4.5009 | 0.0886 | 0.5799 | -1.05 | -1.93 |
| Comp Exp. D | 3.40 | 6.00 | 4.3045 | 0.0080 | 0.7834 | -2.10 | -1.89 |
| Comp Exp. E | 4.70 | 6.04 | 4.2180 | 0.0058 | 0.8192 | -2.24 | -2.07 |
| Comp Exp. F | 2.50 | 6.00 | 4.3216 | 0.0082 | 0.8073 | -2.09 | -1.72 |
| Comp Exp. G | 4.00 | | 4.2018 | 0.0069 | 0.8229 | -2.16 | -1.98 |
| Comp Exp. H | 4.00 | | 4.2201 | 0.0072 | 0.7981 | -2.14 | -1.98 |
| Comp Exp. I | 4.00 | | 4.1862 | 0.0054 | 0.8378 | -2.27 | -1.98 |
| Comp Exp. J | 1.08 | 5.75 | 4.8931 | 0.0225 | 0.7454 | -1.65 | -1.24 |
| Comp Exp. K | 0.85 | 7.66 | 4.8715 | 0.0476 | 0.6252 | -1.32 | -1.11 |
| Comp Exp. L | 0.98 | 5.66 | 4.8398 | 0.0245 | 0.7761 | -1.61 | -1.19 |
| Comp Exp. M | 0.74 | 5.65 | 4.9648 | 0.0321 | 0.7606 | -1.49 | -1.03 |

TABLE 5

ATREF/DV Data

| Example # | 9 | 10 | 11 | 12 | 13 | 14 |
|---|---|---|---|---|---|---|
| Melt Index (g/10 min) | 4.95 | 4.82 | 4.80 | 4.87 | 2.30 | 3.32 |
| Density (g/cm3) | 0.9182 | 0.9184 | 0.9182 | 0.9177 | — | — |
| $I_{10}/I_2$ Ratio | 6.51 | 6.46 | 6.48 | 6.64 | 7.04 | 6.92 |
| Mw/Mn Ratio | 2.58 | 2.53 | 2.60 | 2.51 | 2.41 | 2.73 |
| $T_1$ °C. | 77 | 80 | 80 | 80 | 79 | 75 |
| $T_2$ °C. | 98 | 97 | 98 | 98 | 98 | 99 |
| $T_2 - T_1$ °C. | 21 | 17 | 18 | 18 | 19 | 24 |
| $Mv_1/Mv_2$ | 0.670 | 0.699 | 0.686 | 0.728 | 0.577 | 0.629 |

What is claimed is:

1. A cast stretch film comprising an interpolymer composition which further comprises:

(A) a substantially linear ethylene/α-olefin interpolymer present in the composition in an amount of from about 10 to about 100% by weight based on the combined weight of Components A and B, the substantially linear interpolymer having a density of from about 0.860 to about 0.925 g/cm³, a melt index ($I_2$) of from about 0.2 to about 7.0 g/10 min, an $I_{10}/I_2 \geq 5.63$, and is an interpolymer of ethylene with at least one $C_3$–$C_{20}$ α-olefin; and (B) a heterogeneous interpolymer present in the composition in an amount of from about 0 to about 90% by weight based on the combined weight of Components A and B, the heterogeneous polymer having a density of from about 0.895 to about 0.955 g/cm³, a melt index ($I_2$) of from about 0.2 to about 500 g/10 min.; and wherein said interpolymer composition has a density of from about 0.910 to about 0.922 g/cm³, a melt index ($I_2$) of from about 2.0 to about 6.0 g/10 min and an $I_{10}/I_2$ of less than about 10.0 and a molecular weight distribution which conforms to the relationship $M_w/M_n \leq 3$ and is characterized as having a viscosity at 100 rad/s and a relaxation time ($\tau$) which satisfies either of the following relationships at 190° C.;

$$\text{Log(viscosity at 100 rad/s)} \leq 4.43 - 0.8 \log(I_2)$$

or $$\log(\tau) > -1.2 - 1.3* \times \log(I_2).$$

2. The cast stretch film of claim 1 wherein component A is present in the interpolymer composition in an amount of from about 10 to about 90% by weight based on the combined weight of components A and B, and component B is present in the composition in an amount of from about 10 to about 90% by weight based on the combined weight of components A and B.

3. The cast stretch film of claim 1 wherein component A is present in the composition in an amount of from about 10 to about 90% by weight based on the combined weight of components A and B, and component B is present in the composition in an amount of from about 10 to about 90% by weight based on the combined weight of components A and B, wherein said interpolymer composition has a density of from about 0.912 to about 0.920 g/cm³, and an $I_{10}/I_2$ of less than about 9.0; and wherein (a) Component A has a density of from about 0.880 to about 0.920 g/cm³, a melt index ($I_2$) of from about 0.4 to about 4.0 g/10 min and is an interpolymer of ethylene with at least one $C_3$–$C_8$ α-olefin; and (b) Component B has a density of from about 0.900 to about 0.945 g/cm³, a melt index ($I_2$) of 0.4 to 250 g/10 min.

4. The cast stretch film of claim 1 wherein component A is present in the composition in an amount of from about 35 to about 55% by weight based on the combined weight of components A and B, and component B is present in the composition in an amount of from about 45 to about 65% by weight based on the combined weight of components A and B, wherein said interpolymer composition has a density of from about 0.915 to about 0.919 g/cm³ and an $I_{10}/I_2$ of less than about 8.0; and wherein (a) Component A has a density of from about 0.895 to about 0.915 g/cm³, a melt index ($I_2$) of from about 0.5 to about 2.0 g/10 min, a $M_w/M_n$ of from about 1.8 to about 3.0, and is an interpolymer of ethylene and octene-1; and (b) Component B has a density of from about 0.910 to about 0.935 g/cm³, a melt index ($I_2$) of 0.5 to 50 g/10 min.

5. The cast stretch film of claim 1, wherein component A comprises at least one substantially linear ethylene/α-olefin interpolymer characterized as having: a) a molecular weight distribution $M_w/M_n$, defined by the equation:

$$M_w/M_n \leq (I_{10}/I_2) - 4.63,$$

and b) a critical shear rate at onset of surface melt fracture of at least 50 percent greater than the critical shear rate at the onset of surface melt fracture of a linear ethylene/α-olefin polymer having about the same $I_2$ and $M_w/M_n$.

6. The cast stretch film of claim 1, wherein Component A comprises at least one substantially linear ethylene/α-olefin interpolymer characterized as having:
   a) a molecular weight distribution $M_w/M_n$, defined by the equation:

$$M_w/M_n \leq (I_{10}/I_2) - 4.63,$$

and
   b) a processing index less than or equal to about 70 percent of the processing index of a linear ethylene/α-olefin polymer having about the same $I_2$ and $M_w/M_n$.

7. The cast stretch film of claim 1, wherein the substantially linear ethylene/α-olefin interpolymer has from about 0.01 to about 3 long chain branches/1000 carbons along the polymer backbone.

8. The cast stretch film of claim 1, wherein
   (A) Component A is prepared by contacting ethylene and at least one other α-olefin under polymerization conditions in the presence of a constrained geometry catalyst composition in the presence of the cocatalyst containing either no aluminum cocatalyst or only a small amount of aluminum cocatalyst in at least one reactor to produce a first interpolymer which has a composition distribution branch index of greater than 30%; and
   (B) Component B is prepared by contacting ethylene and at least one other α-olefin under polymerization conditions in the presence of a heterogeneous Ziegler catalyst in at least one other reactor to produce a second interpolymer which exhibits at least two melting peaks as determined using differential scanning calorimetry, and
   (C) combining the first interpolymer with the second interpolymer to form a polymer mixture.

9. The cast stretch film of claim 1, wherein
   (A) Component A is prepared by contacting ethylene and at least one other α-olefin under solution polymerization conditions in the presence of a constrained geometry catalyst composition containing either no aluminum cocatalyst or only a small amount of aluminum cocatalyst in at least one reactor to produce a solution of a first interpolymer which has a composition distribution branch index of greater than 30%; and
   (B) Component B is prepared by contacting ethylene and at least one other α-olefin under solution polymerization conditions and at a higher polymerization reaction temperature than used in step (A) in the presence of a heterogeneous Ziegler catalyst in at least one other reactor to produce a solution of a second interpolymer which exhibits at least two melting peaks as determined using differential scanning calorimetry, and
   (C) combining the solution of the first interpolymer to form a high temperature polymer solution comprising the ethylene/α-olefin interpolymer composition, and
   (D) removing the solvent from the polymer solution of step (C) and recovering the ethylene/α-olefin interpolymer composition.

10. The cast stretch film of claim 1, wherein Component A and Component B are interpolymers of ethylene with octene-1.

11. The cast stretch film of claim 1, wherein the interpolymer composition has a viscosity at 100 rad/s $\leq$ 10,000 poise.

12. A cast stretch film comprising an interpolymer composition which has two or more distinct peaks in the analytical temperature rising elution fraction curve; and wherein $$T_2 - T_1 \leq 25° C.$$

where $T_2$ is the elution temperature of the highest crystallization peak and $T_1$ is the elution temperature of the lowest crystallization peak;
and wherein $$Mv_1/Mv_2 \leq 1;$$

where $Mv_2$ is the viscosity average molecular weight at the peak having the highest elution temperature and $Mv_1$ is the viscosity average molecular weight at the peak having the lowest elution temperature;
and wherein $$M_w/M_n \leq 3.$$

13. The cast stretch of claim 12 wherein the interpolymer composition comprises a substantially linear ethylene/α-olefin copolymer said composition having a density of from about 0.910 to about 9.22 g/cm³, a melt index ($I_2$) of from about 0.5 to about 10 g/10 min and an $I_{10}/I_2$ of less than about 10.0.

14. The cast stretch film of claim 12 wherein the interpolymer composition is an interpolymer of ethylene with at least one $C_3$–$C_8$ α-olefin and has a density of from about 0.912 to about 0.920 g/cm³, a melt index ($I_2$) of from about 1.0 to about 7.0 g/10 min and an $I_{10}/I_2$ of less than about 9.0.

15. The cast stretch film of claim 12 wherein the interpolymer composition is an interpolymer of ethylene and octene-1 and has a density of from about 0.915 to about 0.919 g/cm³, a melt index ($I_2$) of from about 2.0 to about 6.0 g/10 min and an $I_{10}/I_2$ of less than about 8.0.

16. An interpolymer composition comprising;
   (A) a substantially linear ethylene/α-olefin interpolymer present in the composition in an amount of from about 10 to about 100% by weight based on the combined weight of Components A and B, the substantially linear interpolymer having a density of from about 0.860 to about 0.925 g/cm³, a melt index ($I_2$) of from about 0.2 to about 7.0 g/10 min, an $I_{10}/I_2 \geq 5.63$, and is an interpolymer of ethylene with at least one $C_3$–$C_{20}$ olefin; and
   (B) a heterogeneous interpolymer present in the composition in an amount of from about 10 to about 90% by weight based on the combined weight of Components A and B, the heterogeneous polymer having a density of from about 0.895 to about 0.955 g/cm³, a melt index ($I_2$) of from about 0.2 to about 500 g/10 min.; and
   wherein said interpolymer composition has a density of from about 0.910 to about 0.922 g/cm³, a melt index ($I_2$) of from about 2.0 to about 6.0 g/10 min and an $I_{10}/I_2$ of less than about 10.0 and a molecular weight distribution which conforms to the relationship $M_w/M_n \leq 3$ and is characterized as having a viscosity at 100 rad/s and a relaxation time ($\tau$) which satisfies either of the following relationships;

$$\text{Log(viscosity at 100 rad/s)} \leq 4.43 - 0.8 \log(I_2)$$

or $$\log(\tau) > -1.2 - 1.3 * \times \log(I_2)$$

at 190° C. and wherein the interpolymer composition which has two or more distinct peaks in the analytical temperature rising elution fraction curve; the interpolymer exhibits the relationship $$T_2-T_1 \leq 25°\ C.$$

where $T_2$ is the elution temperature of the highest crystallization peak and $T_1$ is the elution temperature of the lowest crystallization peak; and the interpolymer exhibits the relationship $$Mv_1/Mv_2 \leq 1,$$

where $Mv_2$ is the viscosity average molecular weight at the peak having the highest elution temperature and $Mv_1$ is the viscosity average molecular weight at the peak having the lowest elution temperature.

17. The interpolymer composition of claim 16 wherein component A is present in the composition in an amount of from about 10 to about 90% by weight based on the combined weight of components A and B.

18. The interpolymer composition of claim 16 wherein component A is present in the composition in an amount of from about 10 to about 90% by weight based on the combined weight of components A and B, and wherein said interpolymer composition has a density of from about 0.912 to about 0.920 g/cm³, and an $I_{10}/I_2$ of less than about 9.0; and wherein
  (a) Component A has a density of from about 0.880 to about 0.920 g/cm³, a melt index ($I_2$) of from about 0.4 to about 4.0 g/10 min and is an interpolymer of ethylene with at least one $C_3$–$C_8$ α-olefin; and
  (b) Component B has a density of from about 0.900 to about 0.945 g/cm³, a melt index ($I_2$) of from about 0.4 to about 250 g/10 min.

19. The interpolymer composition of claim 16 wherein component A is present in the composition in an amount of from about 35 to about 55% by weight based on the combined weight of components A and B, and component B is present in the composition in an amount of from about 45 to about 65% by weight based on the combined weight of components A and B, and wherein said interpolymer composition has a density of from about 0.915 to about 0.919 g/cm³ and an $I_{10}/I_2$ of less than about 8.0; and wherein
  (a) Component A has a density of from about 0.895 to about 0.915 g/cm³, a melt index ($I_2$) of from about 0.5 to about 2.0 g/10 min a $M_w/M_n$ of from about 1.8 to about 3.0, and is an interpolymer of ethylene and octene-1; and
  (b) Component B has a density of from about 0.910 to about 0.935 g/cm³, a melt index ($I_2$) of from about 0.5 to about 500 g/10 min.

20. The interpolymer composition of claim 16 wherein component A comprises at least one substantially linear ethylene/α-olefin interpolymer characterized as having:
  a) a molecular weight distribution $M_w/M_n$, defined by the equation:

$$M_w/M_n \leq (I_{10}/I_2)-4.63,$$

and
  b) a critical shear rate at onset of surface melt fracture of at least 50 percent greater than the critical shear rate at the onset of surface melt fracture of a linear ethylene/α-olefin polymer having the same $I_2$ and $M_w/M_n$.

21. The interpolymer composition of claim 16 wherein component A comprises at least one substantially linear ethylene/α-olefin interpolymer characterized as having:
  a) a molecular weight distribution $M_w/M_n$, defined by the equation:

$$M_w/M_n(I_{10}/I_2)-4.63,$$

and
  b) a processing index less than or equal to about 70 percent of the processing index of a linear ethylene/α-olefin polymer having about the same $I_2$ and $M_w/M_n$.

22. The interpolymer composition of claim 16, wherein the substantially linear ethylene/α-olefin interpolymer has from about 0.01 to about 3 long chain branches/1000 carbons along the polymer backbone.

23. The interpolymer composition of claim 16, wherein the interpolymer composition has a viscosity at 100 rad/s ≤ 10,000 poise.

24. An interpolymer composition which has two or more distinct peaks in the analytical temperature rising elution fraction curve; and wherein $$T_2-R_1 \leq 25°\ C.$$

where $T_2$ is the elution temperature of the highest crystallization peak and $T_1$ is the elution temperature of the lowest crystallization peak;
and wherein $$Mv_1/Mv_2 \leq 1;$$

where $Mv_2$ is the viscosity average molecular weight at the peak having the highest elution temperature and $Mv_1$ is the viscosity average molecular weight at the peak having the lowest elution temperature;
and wherein $$M_w/M_n \leq 3.$$

25. The interpolymer composition of claim 24, which comprises a substantially linear ethylene/α-olefin copolymer said composition having a density of from about 0.910 to about 9.22 g/cm³, a melt index ($I_2$) of from about 0.5 to about 10 g/10 min and an $I_{10}/I_2$ of less than about 10.0.

26. The interpolymer composition of claim 24, having a density of from of from about 0.912 to about 0.920 g/cm³, a melt index ($I_2$) of from about 1.0 to about 7.0 g/10 min and an $I_{10}/I_2$ of less than about 9.0; which is an interpolymer of ethylene with at least one $C_3$–$C_8$ α-olefin.

27. The interpolymer composition of claim 24 having a density of from about 0.915 to about 0.919 g/cm³, a melt index ($I_2$) of from about 2.0 to about 6.0 g/10 min and an $I_{10}/I_2$ of less than about 8.0; which is an interpolymer of ethylene and octene-1.

28. The interpolymer composition of claim 16, wherein
  (A) Component A is prepared by contacting ethylene and at least one other α-olefin under polymerization conditions in the presence of a constrained geometry catalyst composition in the presence of the cocatalyst containing either no aluminum cocatalyst or only a small amount of aluminum cocatalyst in at least one reactor to produce a first interpolymer which has composition distribution branch index of greater than 30%, and
  (B) Component B is prepared by contacting ethylene and at least one other α-olefin under polymerization conditions in the presence of a heterogeneous Ziegler catalyst in at least one other reactor to produce a second interpolymer which exhibits at least two melting peaks as determined using differential scanning calorimetry, and (C) combining the first interpolymer with the second interpolymer to form a polymer mixture.

29. The interpolymer composition of claim 16, wherein (A) Component A is prepared by contacting ethylene and at least one other α-olefin under solution polymerization conditions in the presence of a constrained geometry catalyst composition containing either no aluminum cocatalyst or only a small amount of aluminum cocatalyst in at least one reactor to produce a solution of a first interpolymer which has composition distribution branch index of greater than 30%, and (B) Component B is prepared by contacting ethylene and at least one other α-olefin under solution polymerization conditions and at a higher polymerization reaction temperature than used in step (A) in the presence of a heterogeneous Ziegler catalyst in at least one other reactor to produce a solution of a second interpolymer which exhibits at least two melting peaks as determined using differential scanning calorimetry, and (C) combining the solution of the first interpolymer with the solution of the second interpolymer to form a high temperature polymer solution comprising the ethylene/α-olefin interpolymer composition, and (D) removing the solvent from the polymer solution of step (C) and recovering the ethylene/α-olefin interpolymer composition.

30. A cast stretch film comprising an interpolymer composition which further comprises:

(A) a substantially linear ethylene/α-olefin interpolymer present in the composition in an amount of from about 10 to about 100% by weight based on the combined weight of Components A and B, the substantially linear interpolymer having a density of from about 0.860 to about 0.925 g/cm$^3$, a melt index ($I_2$) of from about 0.2 to about 7.0 g/10 min, an $I_{10}/I_2 \geq 5.63$, and is an interpolymer of ethylene with at least one $C_3$–$C_{20}$ α-olefin; and (B) a heterogeneous interpolymer present in the composition in an amount of from about not more than about 90% by weight based on the combined weight of Components A and B, the heterogeneous polymer having a density of from about 0.895 to about 0.955 g/cm$^3$, a melt index ($I_2$) of from about 0.2 to about 500 g/10 min.; and wherein said interpolymer composition has a density of from about 0.910 to about 0.922 g/cm$^3$, a melt index ($I_2$) of from about 2.0 to about 6.0 g/10 min and an $I_{10}/I_2$ of less than about 10.0 and a molecular weight distribution which conforms to the relationship $M_w/M_n \leq 3$ and is characterized as having a viscosity at 100 rad/s and a relaxation time (τ) which satisfies either of the following relationships;

Log(viscosity at 100 rad/s)≦4.43−0.8 log($I_2$)

or log(τ)>−1.2−1.3×log($I_2$)

at 190° C. and wherein the interpolymer composition which has two or more distinct peaks in the analytical temperature rising elution fraction curve; the interpolymer exhibits the relationship $T_2-T_1 \leq 25°$ C.

where $T_2$ is the elution temperature of the highest crystallization peak and $T_1$ is the elution temperature of the lowest crystallization peak; and the interpolymer exhibits the relationship $Mv_1/Mv_2 \leq 1$, where $Mv_2$ is the viscosity average molecular weight at the peak having the highest elution temperature and $Mv_1$ is the viscosity average molecular weight at the peak having the lowest elution temperature.

31. The cast stretch film of claim 30 wherein component B is present in the composition in an amount from about 10% to about 90% by weight based upon the combined weight of components A and B.

32. The cast stretch film of claim 31 wherein component A is present in the interpolymer composition in an amount of from about 10 to about 90% by weight based on the combined weight of components A and B.

33. The cast stretch film of claim 31 wherein component A is present in the composition in an amount of from about 10 to about 90% by weight based on the combined weight of components A and B, and wherein said interpolymer composition has a density of from about 0.912 to about 0.920 g/cm$^3$, and an $I_{10}/I_2$ of less than about 9.0; and wherein (a) Component A has a density of from about 0.880 to about 0.920 g/cm$^3$, a melt index ($I_2$) of from about 0.4 to about 4.0 g/10 min, and is an interpolymer of ethylene with at least one $C_3$–$C_8$ α-olefin; and (b) Component B has a density of from about 0.900 to about 0.945 g/cm$^3$, a melt index ($I_2$) of 0.4 to 250 g/10 min.

34. The cast stretch film of claim 31 wherein component A is present in the composition in an amount of from about 35 to about 55% by weight based on the combined weight of components A and B, and component B is present in the composition in an amount of from about 45 to about 65% by weight based on the combined weight of components A and B, wherein said interpolymer composition has a density of from about 0.915 to about 0.919 g/cm$^3$, and an $I_{10}/I_2$ of less than about 8.0; and wherein (a) Component A has a density of from about 0.895 to about 0.915 g/cm$^3$, a melt index ($I_2$) of from about 0.5 to about 2.0 g/10 min, a $M_w/M_n$ of from about 1.8 to about 3.0, and is an interpolymer of ethylene and octene-1; and (b) Component B has a density of from about 0.910 to about 0.935 g/cm$^3$, a melt index ($I_2$) of 0.5 to 50 g/10 min.

35. The cast stretch film of claim 31, wherein component A comprises at least one substantially linear ethylene/α-olefin interpolymer characterized as having:

a) a molecular weight distribution $M_w/M_n$, defined by the equation: $M_w/M_n \leq (I_{10}/I_2)-4.63$, and b) a critical shear rate at onset of surface melt fracture of at least 50 percent greater than the critical shear rate at the onset of surface melt fracture of a linear ethylene/α-olefin polymer having about the same $I_2$ and $M_w/M_n$.

36. The cast stretch film of claim 31, wherein Component A comprises at least one substantially linear ethylene/α-olefin interpolymer characterized as having:

a) a molecular weight distribution $M_w/M_n$, defined by the equation: $M_w/M_n \leq (I_{10}/I_2)-4.63$, and b) a processing index less than or equal to about 70 percent of the processing index of a linear ethylene/α-olefin polymer having about the same $I_2$ and $M_w/M_n$.

37. The cast stretch film of claim 31, wherein the substantially linear ethylene/α-olefin interpolymer has from about 0.01 to about 3 long chain branches/1000 carbons along the polymer backbone.

* * * * *